US011175968B2

(12) United States Patent
Yuan

(10) Patent No.: US 11,175,968 B2
(45) Date of Patent: Nov. 16, 2021

(54) EMBEDDING AN INTERFACE OF ONE APPLICATION INTO AN INTERFACE OF ANOTHER APPLICATION

(71) Applicant: BANMA ZHIXING NETWORK (HONGKONG) CO., LIMITED, Kowloon (HK)

(72) Inventor: Zhijun Yuan, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 0 days.

(21) Appl. No.: 16/376,784

(22) Filed: Apr. 5, 2019

(65) Prior Publication Data

US 2019/0303219 A1   Oct. 3, 2019

Related U.S. Application Data

(63) Continuation-in-part of application No. PCT/CN2017/103855, filed on Sep. 28, 2017.

(30) Foreign Application Priority Data

Oct. 13, 2016   (CN) .......................... 201610895964.6

(51) Int. Cl.
  *G06F 3/00* (2006.01)
  *G06F 9/54* (2006.01)
  (Continued)

(52) U.S. Cl.
  CPC ............ *G06F 9/543* (2013.01); *G06F 9/44* (2013.01); *G06F 9/445* (2013.01); *G06F 9/451* (2018.02)

(58) Field of Classification Search
  CPC ................................. G06F 9/54; G06F 9/543
  (Continued)

(56) References Cited

U.S. PATENT DOCUMENTS 6,128,655 A * 10/2000 Fields .................... G06Q 30/02
                                                            709/219
6,675,230 B1   1/2004 Lewallen
(Continued)

FOREIGN PATENT DOCUMENTS

CN   101377778   3/2009
CN   102541455   7/2012
(Continued)

OTHER PUBLICATIONS

Magnus Almgren, A Lightweight Tool for Detecting Web Server Attacks. (Year: 2004).*
(Continued)

*Primary Examiner* — Lechi Truong
(74) *Attorney, Agent, or Firm* — Van Pelt, Yi & James LLP

(57) ABSTRACT

Causing an interface of one application to be embedded into an interface of another application is disclosed, including: receiving a service request from a terminal; determining that the service request is associated with a second application; determining interface data that is used to generate the second interface associated with the second application; and sending the interface data to the terminal. Embedding an interface of one application into an interface of another application is disclosed, including: presenting a first interface associated with a first application; generating a service request for a requested service feature; receiving interface data determined based at least in part on the service request; generating a second interface associated with a second application using the interface data; and embedding and presenting the second interface associated with the second application within the first interface associated with the first application.

20 Claims, 14 Drawing Sheets

(51) Int. Cl.
　　　*G06F 9/451*　　　(2018.01)
　　　*G06F 9/445*　　　(2018.01)
　　　*G06F 9/44*　　　(2018.01)

(58) Field of Classification Search
　　　USPC ........................................................ 719/310
　　　See application file for complete search history.

(56) References Cited

U.S. PATENT DOCUMENTS

| | | | |
|---|---|---|---|
| 6,680,749 | B1 | 1/2004 | Anderson |
| 6,801,224 | B1 * | 10/2004 | Lewallen .................. G06F 8/38 |
| | | | 715/744 |
| 7,370,284 | B2 | 5/2008 | Andrea |
| 7,487,214 | B2 | 2/2009 | Qureshi |
| 7,559,034 | B1 * | 7/2009 | Paperny .............. G06F 9/44526 |
| | | | 345/629 |
| 8,973,056 | B2 | 3/2015 | Ellis |
| 2008/0183905 | A1 | 7/2008 | Hiroshi |
| 2009/0088254 | A1 * | 4/2009 | Courage ............... A63F 13/795 |
| | | | 463/42 |

FOREIGN PATENT DOCUMENTS

| | | |
|---|---|---|
| CN | 102546952 | 7/2012 |
| CN | 103942039 | 7/2014 |

OTHER PUBLICATIONS

Hooman Homayounfar, A Parsing Cache for Highly Efficient XML Data Processing. (Year: 2006).*

* cited by examiner

EMBEDDING AN INTERFACE OF ONE APPLICATION INTO AN INTERFACE OF ANOTHER APPLICATION

CROSS REFERENCE TO OTHER APPLICATIONS

This application is a continuation-in-part of and claims priority to International (PCT) Application No. PCT/CN2017/0103855, entitled MULTI-SERVICE INTEGRATION METHOD AND APPARATUS, INTELLIGENT TERMINAL, SERVER AND OPERATING SYSTEM filed on Sep. 28, 2017 which is incorporated herein by reference in its entirety for all purposes, which claims priority to China Patent Application No. 201610895964.6, entitled METHOD, MEANS, SMART TERMINAL, SERVER AND OPERATING SYSTEM FOR INTEGRATING MULTIPLE SERVICES, filed on Oct. 13, 2016 which is incorporated by reference in its entirety for all purposes.

FIELD OF THE INVENTION

The present application relates to a field of terminal technology. In particular, the present application relates to techniques for embedding interfaces associated with different applications.

BACKGROUND OF THE INVENTION

As terminal technology develops, more and more users make use of terminals. An example of a terminal is a mobile computing device such as a smart phone. Terminals provide an ever-increasing array of functional services. The services currently provided by terminals generally are provided through applications or through web pages. The portals for providing service features are generally set up on desktops or as web page links.

Sometimes, a user using a service feature is in need of another service that is provided by another application. However, because the providers (e.g., applications) of the different service features are different, the user often needs to exit the current application and start another application that provides the needed service or to switch from the current page to another web page that provides the needed service.

However, switching from one application to another or switching from web page to another web page that provides a different service feature requires the user to leave the previous application or web page. However, manually transitioning back and forth from a current application/page to the new application/page is inconvenient and is also distracting to the user of each application/page. Furthermore, manually transitioning back and forth from the current application/page to the new application/page may cause the user to miss dynamic updates that may be made to the first application/page.

SUMMARY OF THE INVENTION

The present application discloses techniques comprising:
receiving a service request from a terminal, wherein a first interface associated with a first application is presented at the terminal;
determining that the service request is associated with a second application;
determining interface data that is used to generate a second interface associated with the second application; and
sending the interface data to the terminal, wherein the interface data is configured to be used by the terminal to generate and embed the second interface associated with the second application within the first interface associated with the first application.

The present application further discloses techniques comprising:
presenting a first interface associated with a first application;
generating a service request for a requested service feature;
receiving interface data determined based at least in part on the service request;
generating a second interface associated with a second application using the interface data; and
embedding and presenting the second interface associated with the second application within the first interface associated with the first application.

BRIEF DESCRIPTION OF THE DRAWINGS

Various embodiments of the invention are disclosed in the following detailed description and the accompanying drawings.

DETAILED DESCRIPTION

Figure 1A:
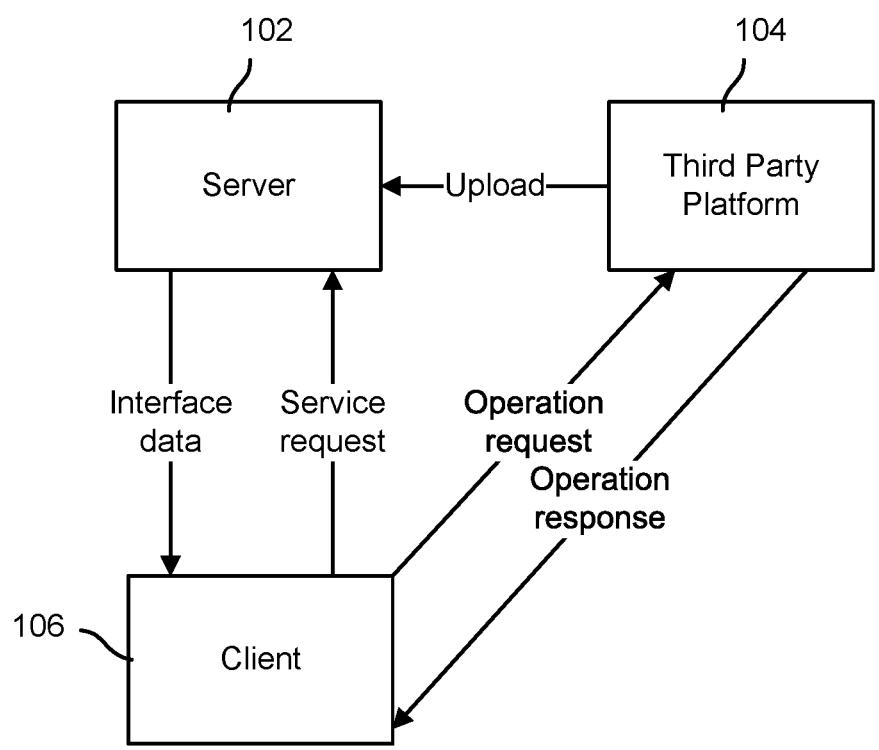
FIG. 1A is a diagram showing an embodiment of a system for embedding an interface of one application into an interface of another application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

To make the above-described objectives, features, and advantages of the present application plainer and easier to understand, the present application is explained in further detail below with the drawings and specific embodiments.

In various embodiments, "smart terminals" or just "terminals" refer to devices with multimedia functions and the capacity to send and receive data over a network. For example, smart terminals may support audio, video, data, and other functions. In various embodiments, a smart terminal may include a touchscreen and may be a smart phone, a tablet computer, a smart wearable device, a smart TV, or a personal computer. In various embodiments, a smart terminal may use various kinds of smart operating systems, such as IOS, Android, and YunOS, for example.

Conventionally, when a new type of service feature is executed at a smart terminal, it is often done so by switching the display at the screen of the terminal from an interface of the current application/page to an interface of a new application/page. However, this kind of switching necessitates the user having to manually leave the previous service feature interface or page in order to display an interface of the new application/page. Causing the user to manually switch between interfaces/pages is not a convenient or a fast way to provide a service feature. Furthermore, if the previous service feature is needed again, then the user will need to manually switch from the interface of the new application/page back to that of the previous application/page.

Embodiments of embedding an interface of one application into an interface of another application are described herein. A service request is received from a terminal. A first interface associated with a first application is presented at the terminal. It is determined that the service request is associated with a second application. Interface data that is used to generate a second interface associated with the second application is determined. The interface data is sent to the terminal. The interface data is configured to be used by the terminal to generate and embed the second interface associated with the second application within the first interface associated with the first application.

By seamlessly embedding the interface of another application into the currently presented interface of a current application at a terminal, both interfaces may be concurrently visible at the display screen of the terminal. Not only is the user saved the inconvenience of switching between the applications on the device but the user also will not lose the context of the first application after which the interface of a second application is opened and displayed in a manner that is embedded within the interface of the first application. Furthermore, the user will be able to interact with the interface of the second application to request a service or function that is provided by the second application.

In some embodiments, the first application and the second application are different applications and each may be configured to provide different services. As such, by allowing the interface of one application to be embedded in the interface of the other application, different services may be integrated together at the display screen of the terminal.

FIG. 1A is a diagram showing an embodiment of a system for embedding an interface of one application into an interface of another application. As shown in FIG. 1A, the system comprises: server 102, client 106, and third party platform 104. Server 102 is configured to provide services for embedding an interface of an application into the interface of another application. Server 102 may include local servers and network servers that are configured to provide an application and/or data that is used to enable embedding of an interface of another application into a currently presented interface of the provided application. For example, a local server is set up locally on a smart terminal, e.g., as a smart terminal service process, and a network server is set up on the network side and may be a service platform that provides services. Third party platform 104 may include one or multiple server computers capable of maintaining corresponding application logics and providing application data, maintenance, and management services associated with one or more applications. Client 106 is configured to support embeddable interface services. Client 106 may comprise an application that is executing on a terminal. Third party platform 104 may comprise a third party service provider business service platform. Third party platform 104 may be a third party, such as an independent software vendor (ISV), that provides embeddable interfaces such as one that is able to be embedded in another interface.

In various embodiments, an interface that is capable of being embedded into another interface is sometimes referred to as the "second interface" and the currently presented interface in which the "second interface" is embedded in is sometimes referred to as the "first interface." Furthermore, in various embodiments, the first interface is referred to as being associated with a "first application" and the second interface is referred to as being associated with a "second application." As will be described in further detail below, even after the second interface is presented in a manner that is embedded within the first interface, interactive features (e.g., elements) at either of the first interface and the second interface can be selected by a user to trigger services associated with the interface for which the selection was made.

In various embodiments, the embeddable second interface is developed by a third party service provider (e.g., third party platform 104). For example, third party platform 104 may develop a corresponding second interface in the style of and/or includes interactive elements that are with its corresponding application. For example, the interactive elements can be selected to trigger corresponding service features associated with the application that third party platform 104 provides. In various embodiments, a "service feature" comprises a function that is provided by an application or the service providing server with which the application is associated. In various embodiments, third party platform 104 is configured to generate interface data that is usable by a terminal to generate a second interface associated with a second application that is embeddable into a first interface associated with a first application. Third party platform 104 is configured to send/upload the interface data to server 102. After server 102 receives the interface data from third party platform 104, server 102 may make a record (e.g., cache a copy of) the interface data and its associated metadata. For example, server 102 may store the interface data itself and also record the interface data's software interface publisher (e.g., identifying information associated with the third party platform from which the interface data was received), identifying information associated with the second application associated with the embeddable second interface, and the service features that are provided by the second application. In some embodiments, server 102 is configured to publish the associated data (e.g., the identifying information of the publisher and the provided service features) associated with each received instance of an interface data (e.g., at a website) so that users can know which embeddable ("second") interfaces associated with which applications may be embedded into a current interface associated with a current application.

Client 106 comprises the first application for which a first interface is presented at the display screen of the terminal at which client 106 is executing. For example, a user can use the first interface of the first application that is client 106 to perform a corresponding service feature, e.g., order a movie ticket, chat with other users, or view social networking information, in the first interface. If, while using a first interface associated with the first application of client 106, the user of the terminal needs another service feature that is associated with a second application, he or she may trigger the generation of a service request (e.g., through one or more service request generation modes such as speech, button tapping, or gesture). For example, if the user taps a button associated with hailing a ride that is presented at the first interface, a service request for interface data corresponding to a second interface associated with a ride-hailing service application will be sent from the terminal to the server. The service request is configured to request a second interface that is capable of providing the desired service feature. This service request is sent from the terminal on which client 106 is executing to server 102. After server 102 receives the service request, it is configured to determine the requested service feature from the service request and then obtain interface data that is used to generate the corresponding second interface. For example, the requested service feature comprises hailing a ride or making a restaurant reservation. Server 102 then sends the obtained interface data that is used to generate the second interface to the terminal at which client 106 is executing.

After the terminal on which client 106 is executing receives the interface data from server 102, client 106 is configured to parse the interface data and use the parsed interface data to generate a second interface. Client 106 is configured to embed the second interface within the first interface that is currently being presented at the display screen of the terminal. In various embodiments, the second interface is associated with a different application than the application for which the first interface is currently being presented at the display screen of the terminal. In some embodiments, the second interface is embedded within a designated position of the first interface. In some embodiments, the designated position is determined based on the context information of the first application and/or the first interface. The second interface may include interactive elements (e.g., buttons, fields, links) and non-interactive elements (e.g., text and images) associated with the second application. The user may select the interactive elements to trigger one or more service features that are provided by the second application. For example, by selecting an interactive element that is presented in the second interface, a corresponding operation request is sent from the terminal on which client 106 is executing to third party platform 104, which in turn sends back to the terminal a corresponding operation response. The corresponding operation response may be presented in the second interface that is embedded within the first interface of client 106. By embedding the second interface in the first interface, at least a portion of the first interface is simultaneously visible at the display screen of the terminal as the second interface is presented. Furthermore, no portion of the first interface is covered/blocked/obscured by the embeddable second interface. As such, the original content of the first interface can remain normally presented at the display screen of the terminal at the same time that the second interface is presented at the display screen.

Figure 1B:
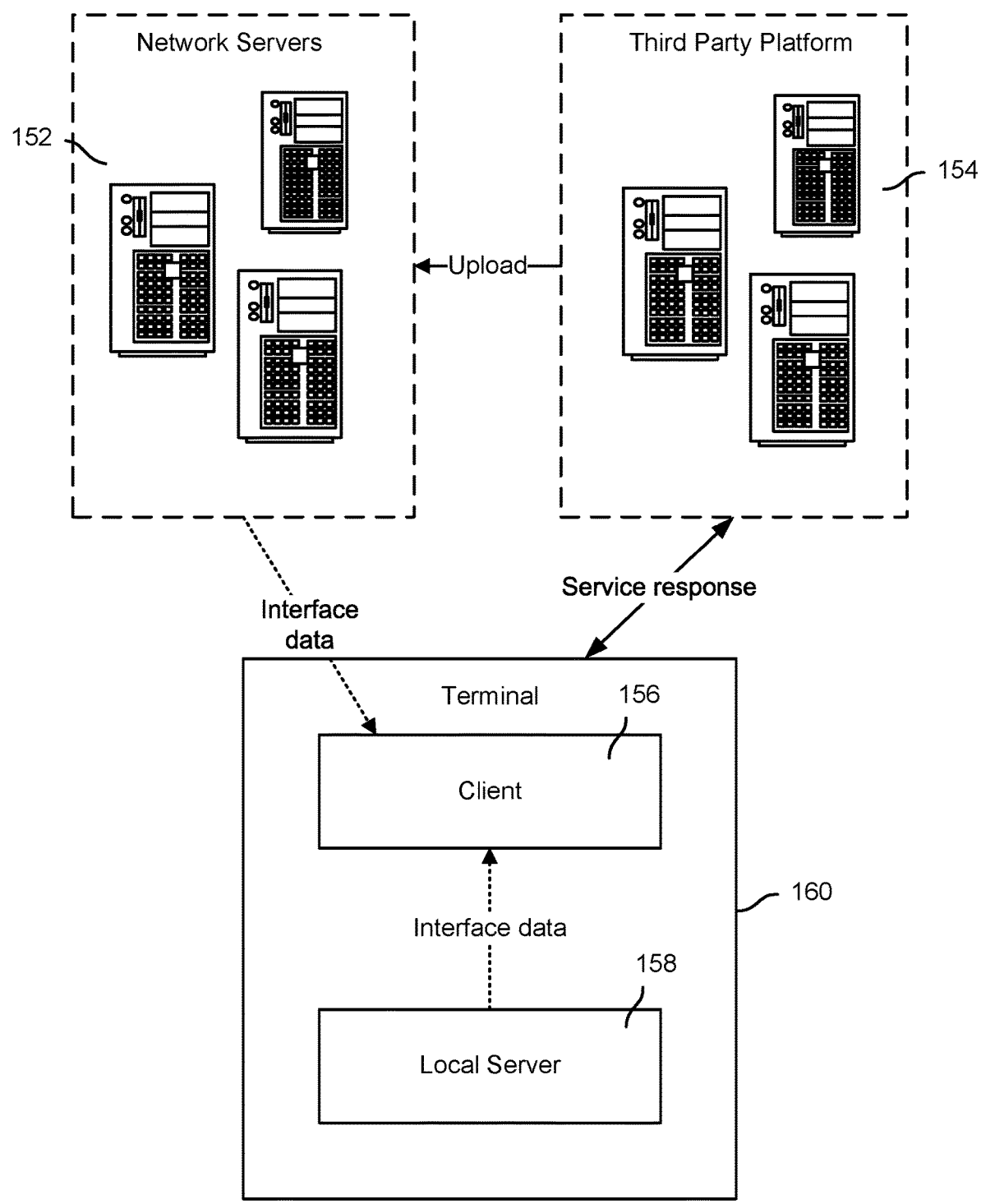
FIG. 1B is a diagram showing an embodiment of a system for embedding an interface of one application into an interface of another application.

FIG. 1B is a diagram showing an embodiment of a system for embedding an interface of one application into an interface of another application. Third party platform 154 may be implemented by third party platform 104 of FIG. 1A and client 156 may be implemented by client 106 of FIG. 1A.

After client 156 (a first application) issues a service request for a service feature (that is provided by a second interface of a different, second application) that is not provided by its first interface, client 156 acquires the corresponding interface data from local server 158 or network servers 152. In some embodiments, local server 158 and network servers 152 can be collectively implemented by server 102 of FIG. 1A. As shown in FIG. 1B, local server 158 and client 156 may be implemented at the same terminal, terminal 160. In some embodiments, client 156 is configured to first issue the service request to local server 158 and if local server 158 fails to find the corresponding interface data, local server 158 forwards the service request to network servers 152, which then proceeds to search the relevant interface data. If network servers 152 are able to find the relevant interface data, network servers 152 are configured to send the interface data to terminal 160.

Figure 2:
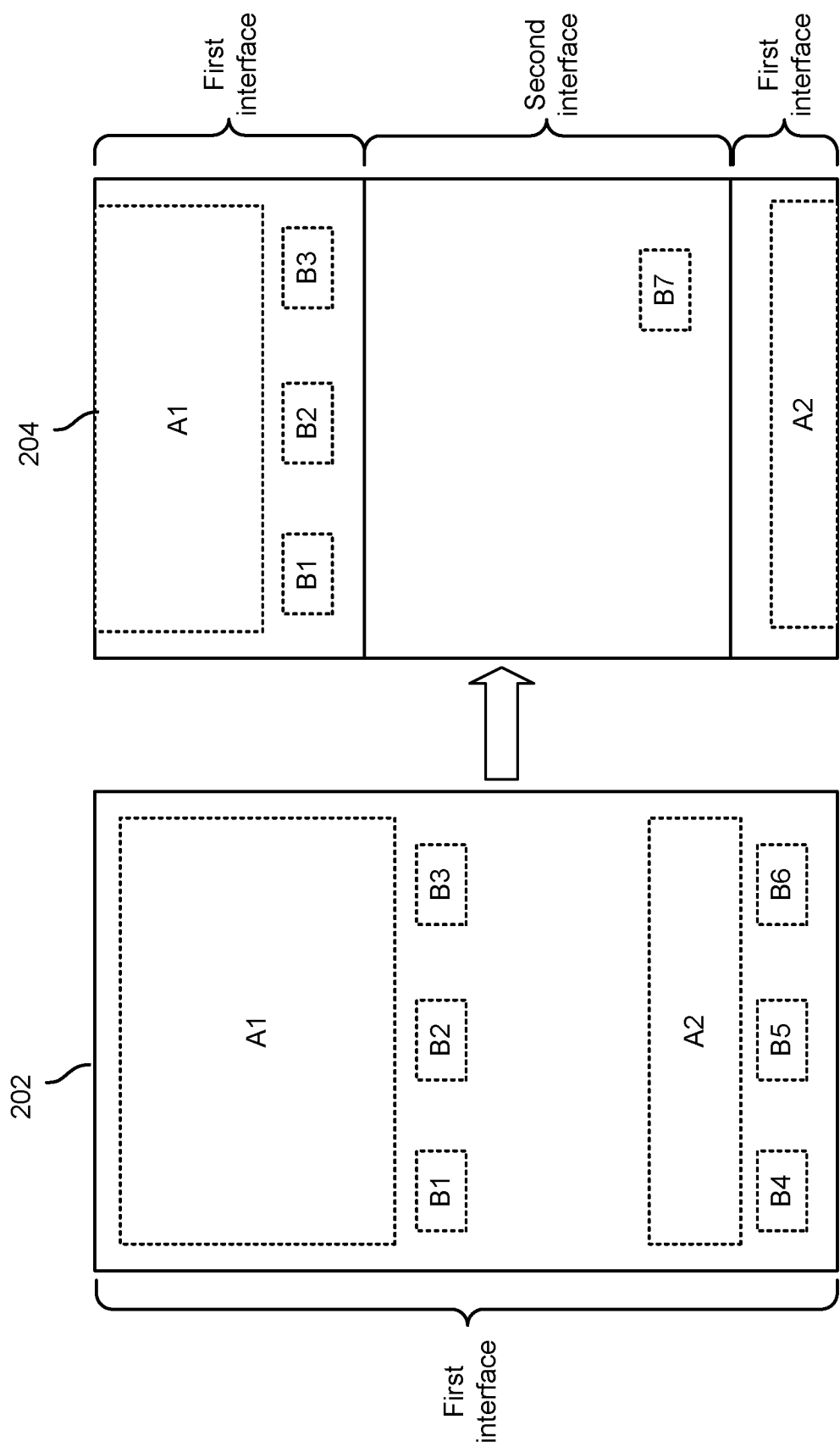
FIG. 2 is a diagram showing examples of a first interface before and after a second interface is embedded within it.

FIG. 2 is a diagram showing examples of a first interface before and after a second interface is embedded within it.

Display screen 202 of a terminal is presenting only a first interface. The first interface can be associated with a first application. The first interface may display various interactive and non-interactive content. For example, A1 and A2 of the first interface may be text, photos, or other content, and B1 through B6 of the first interface may be button controls. Whenever a first interface is displayed, a user may trigger the issuance of a service request for a service that is not provided by the first interface via one of various input modes including speaking a command, tapping on the display screen, or making a gesture with respect to the display screen or a camera input of the terminal, for example. The service request is sent from the terminal to a server, which is configured to determine interface data corresponding to the requested service feature that is indicated in the service request. After the interface data is received at the terminal from the server, the interface data is parsed to generate a second interface associated with a second application, which is different from the first application. The second interface is then embedded within the first interface. In some embodiments, the second interface is embedded within the first interface at a designated position that is indicated in the interface data. Display screen 204 of the terminal shows the second interface displayed in an embeddable manner within the first interface. In the example of display screen 204, the second interface is embedded above content A2 of the first interface and below buttons B1, B2, and B3 of the first interface. As shown in display screen 204, the second interface is embedded in the first interface in such a way that the content of the first interface is not covered or blocked by the second interface.

In various embodiments, as a user scrolls through display screen 204, the embedded second interface will move in tandem with the first interface. In some embodiments, the embedded second interface can be dismissed such that only the first interface will be presented again.

As shown in display screen 204, the second interface displays button B7. In various embodiments, the user can select button B7 to request service(s) associated with the second application that are provided by a third party service provider (e.g., server) that had generated/provided the interface data from which the second interface was generated. In response to the user selection of button B7, an operation request is sent from the terminal to the third party server. Then the third party service server, responding to the operation request, may generate corresponding operation response information. The operation response information is then sent back to the second interface, and corresponding content is presented at the second interface. Thus, in various embodiments, while using a first interface that provides a first type of service features, the user may request another service feature so that a second interface associated with the requested service feature is displayed embedded within the first interface and is configured to provide a second type of service features within the first interface, without blocking content in the first interface.

In various embodiments, the user can still select any of buttons B1, B2, and B3 of the first interface that are presented at display screen 204 to request service(s) associated with the first application that are provided by the server that had also responded to the service request for the interface data. Thus, when the second interface is embedded within the first interface, the services of a third party service provider are available in the second interface in addition to the original services that were provided by the first interface. The user of the terminal is therefore seamlessly provided with multiple, different service features by the embedded interfaces and does not need to close the first interface or manually switch between the first interface and the second interface.

While conventionally, two functional interfaces may be concurrently displayed at a display screen, one interface typically blocks at least a portion of the other interface, rendering some of the content of the other interface to be inaccessible. In various embodiments described herein, a second interface is embedded within a first interface in a manner that does not obscure the content or the functionality of the first interface. Furthermore, the embedded second interface moves in tandem with the first interface in the event that the user scrolls through the first interface.

Figure 3:
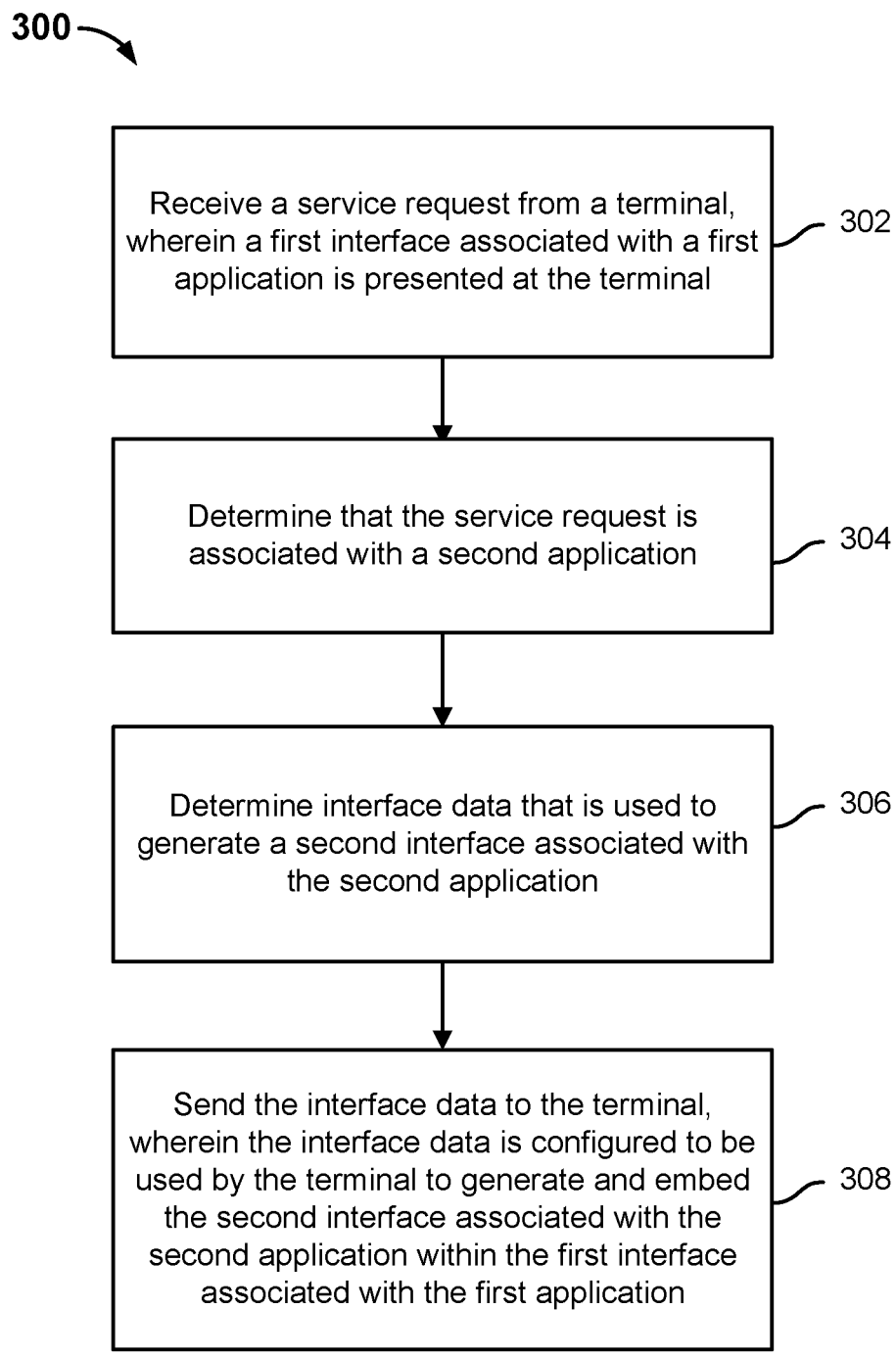
FIG. 3 is a flow diagram showing an embodiment of a process for embedding an interface of one application into an interface of another application.

FIG. 3 is a flow diagram showing an embodiment of a process for embedding an interface of one application into an interface of another application. In some embodiments, process 300 is implemented at server 102 of FIG. 1A.

At 302, a service request is received from a terminal, wherein a first interface associated with a first application is presented at the client device.

The first interface associated with the first application (which is also sometimes referred to as a "client" that is executing at a terminal) is presented at the display screen of the terminal. The first interface may include non-interactive content (e.g., images and text) and/or interactive content (e.g., controls, buttons, selectable elements) associated with one or more service features that are associated with the first application. In a first example, if the first application is a ticket purchasing application, the first interface may display ticket ordering content (e.g., a selection for which performance tickets are to be purchased, a selection for the location of seating, a selection for the number of tickets to be purchased). In a second example, if the first application is an application downloading application, then the first interface may include application recommendations or introductions to new applications for the user.

If, when using the first interface, the user of the terminal needs another service feature that cannot be directly provided by the first application, the user may trigger the generation of a service request, through one of various possible input modes, to call a second application that is capable of providing a requested service feature. Example input modes for triggering the generation of a service request include selecting an element at the first interface, making a predetermined gesture with respect to the display screen and/or camera, and/or making a speech-based command. Then the service request is received at a server. In various embodiments, the server to which the service request is sent is associated with providing one or more services associated with the first application. For example, if the first application were a ticket purchasing application, then the server to which the service request is sent is configured to provide electronic purchases of tickets.

At 304, it is determined that the service request is associated with a second application.

At 306, interface data that is used to generate a second interface associated with the second application is determined.

In various embodiments, the service request includes identifying information associated with a requested service feature (a service identifier). In various embodiments, the identifying information associated with a requested service feature is obtained from the service request to determine the requested third party service provider service feature. After, the interface data corresponding to the requested third party service provider service feature is determined and sent back to the terminal. The interface data includes the information needed for generating, rendering, and providing the functionalities associated with a second interface associated with a second application that is capable of providing the requested service feature and for responding to second interface operations.

At 308, the interface data is sent to the client device, wherein the interface data is configured to be used by the client device to embed the second interface associated with the second application within the first interface associated with the first application.

After receiving the interface data, the terminal (e.g., the first application or operating system executing thereon) is configured to parse the interface data and use the parsed data to generate the second interface associated with the second application. Then, the terminal embeds the second interface in (e.g., a page of) the first interface associated with the first application. As a result, at the display screen, the second interface is presented in a manner that is embedded within the first interface but without blocking/covering/obscuring any of the original content of the first interface. As shown in display screen 204 of FIG. 2, the second interface is embedded between button controls B1, B2 and B3 and interface content A2 of the first interface. Thus, A2 and the content below (buttons B4, B5, and B6) need only be shifted downward within the display screen. In addition, when the user moves (e.g., scrolls through) the first interface, the second interface may move together with the content of the first interface.

In some embodiments, the second interface is displayed at a designated position on a page/section of the first interface. The original content at the designated position on the page/section of the first interface is accordingly shifted to another position on the page so that the second interface will not block the original content of the first interface. Of course, if the second interface is embedded (e.g., effectively, appended) at the designated position of being at the end of the first interface, then there is no need to shift the original content of the first interface.

After the second interface is embedded into the first interface, the second interface may provide corresponding service features associated with the second application in a normal manner (e.g., as if the second interface were displayed by itself at the display screen). Therefore, if the user interacts with interactive elements (e.g., buttons) that are presented at the second interface, the interface data provides the needed information to perform an operation associated with the user selected element. For example, the interface data may include information such as an address of the third party server that provides the service feature associated with the second application, and thus an operation request associated with the selected element at the second interface may be sent to the third party server.

In some embodiments, the server that provides a first application to a terminal is configured to receive various instances of interface data from various third party service providers. Each instance of interface data is used to generate an instance of a second interface associated with an instance of a second application that is capable of providing a corresponding service feature. In some embodiments, the server may publish available service features (names of second applications) at a service platform (e.g., a website, an application, or another type of portal) that are provided by the various interface data that it stores or has access to such that users can be informed of which second interfaces associated with which second applications/service features could be called to be embedded within a first interface associated with the first application.

As mentioned above, while a first interface associated with a first application is presented at a display screen of a terminal, a service request (e.g., that is initiated by the user) for a service feature that is provided by a second application may be sent to a server (e.g., associated with supporting the first application). In response to receiving the service request, the server is configured to determine relevant interface data and send the interface data back to the terminal. The terminal is then configured to parse the received interface data and generate a second interface associated with the second application. The second interface is then embedded within the first interface that is currently presented at the display screen of the terminal. The user can proceed to interact with the embedded second interface to receive service(s) associated with the second application, all the while not having to close the first interface, which remains open and unobstructed by the second interface. Thus, the user can seamlessly enjoy the use of both the first interface and the second interface, simultaneously, without having to switch between the two interfaces.

In some embodiments, a service platform may be established to publish a list of third party provided service features (that are provided by "second" applications) that are accessible within ("second") interfaces that are embeddable within the run context of the ("first") interfaces' other ("first") applications. In some embodiments, the service platform is associated with the server(s) that support the first application(s). For example, the service platform may provide a service search and integration capability and may thus enable any third party service provider to publish service features that are accessible via embeddable second interfaces. Therefore, a third party service provider may, through its own server or other such equipment, upload service feature-related interface data to the service platform. The service platform may then publish descriptions of the service features associated with the uploaded interface data and therefore make it easy for users to determine the embeddable services that can be provided via second interfaces. Thus, an existing first application may be integrated with a third party service feature interface associated with a requested second application, as needed. In this way, third party services can be seamlessly embedded within existing first applications while they are running and presented at a terminal without users needing to depart from the first applications. In some embodiments, a user of the terminal does not even need to download the second applications, for which second interfaces can be embedded within first applications that are currently running at the terminal. As such, the services of different service providers can be seamlessly integrated by embedding a second interface associated with a second application within a first interface associated with a first application. This scheme can boost the service capabilities of applications and also expand distribution channels for third party services.

In various embodiments, the interface data that is used to generate a second interface comprises markup language. For example, the markup language can be any language that is able to describe user interfaces (UI) and interactions based on the XML (Extensible Markup Language) format. The markup language used to generate interface data is referred to hereinafter as "markup language," for illustration. As such, markup language is used to define the interface data for a second interface and embed the second interface in the first interface.

Figure 4:
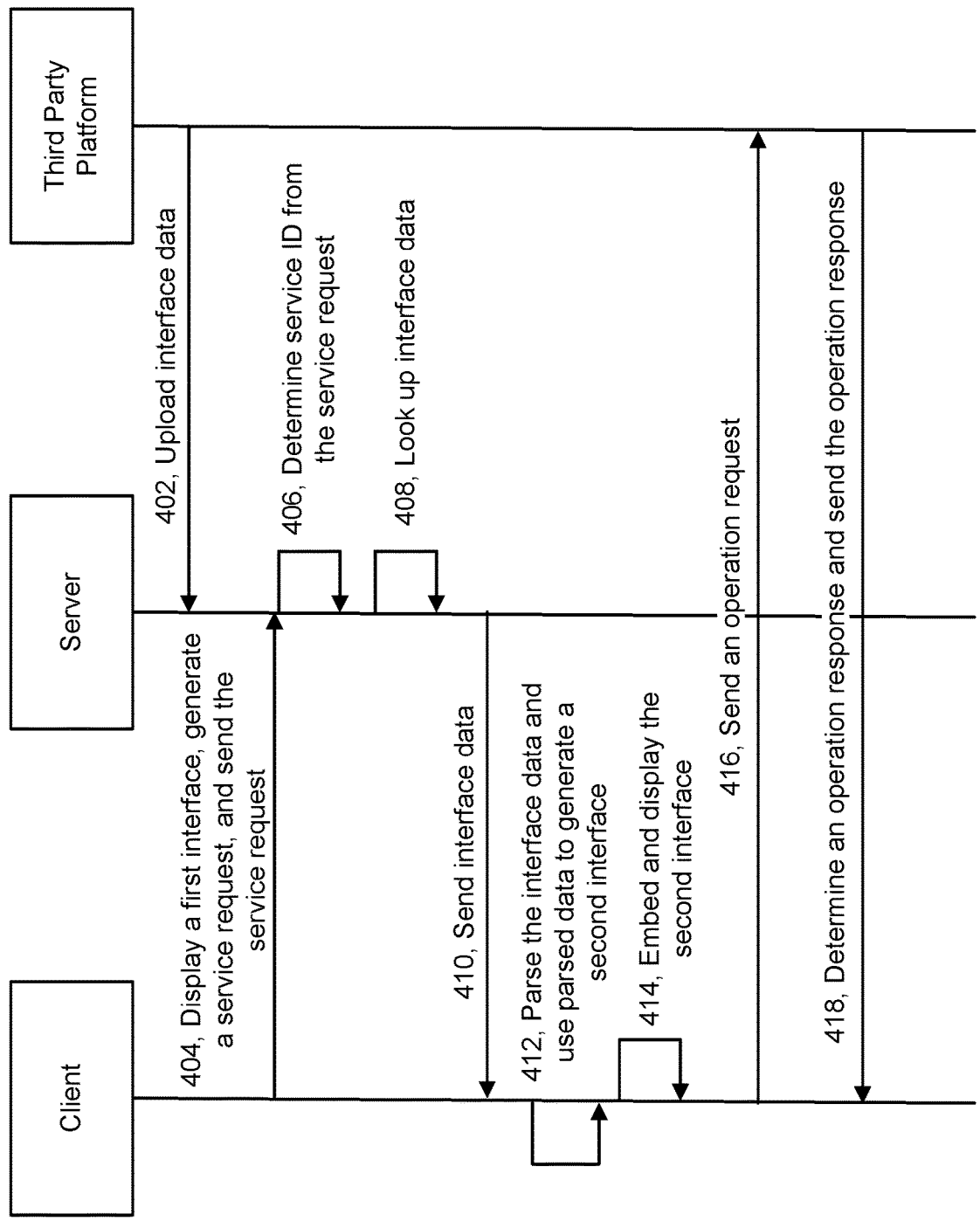
FIG. 4 is a sequence diagram showing an example of a process for embedding an interface of one application into an interface of another application.

FIG. 4 is a sequence diagram showing an example of a process for embedding an interface of one application into an interface of another application. The client, server, and third party platform of FIG. 4 may be implemented by, respectively, client 106, server 102, and third party platform 104 of FIG. 1A.

At 402, interface data is uploaded from a third party platform to a server.

In various embodiments, a server may publish writing rules, definitions of service features, and so on for the markup language that is to be used by third party platforms to generate interface data. Therefore, a third party service provider may obtain the markup language from the server, and use the markup language definitions to generate interface data for a corresponding second interface associated with a second application that is provided by the third party service provider. Then the third party service provider uploads the generated interface data to the server. The interface data is then made available to other applications by virtue of its publication at a service platform associated with the server and also the server's distribution of such interface data in response to service requests.

Table 1, below, shows example definitions of service feature fields that may be included in an interface data that is used to generate a second interface:

TABLE 1

| Key Field | Identifier | Explanation of Field |
| --- | --- | --- |
| Service identifier | id | Unique ID that identifies a service, used in (second) application invocation of the service |
| Service name | name | Name of service, used in (second) application searches and service presentation |
| Service description | desc | Detailed description of service, used in (second) application searches and service presentation |
| Interface description language | markup | Description of a second interface; by using a parsing engine (markup engine), markup can render service interfaces and interactions |
| Data interface | API | A service data acquisition interface, provided by an ISV; a service embedded into an application calls an API to acquire the data presented on the interface |

For example, if the second application provided a ride-hailing service, the corresponding interface data could include the following key field values: "id": 123, "name": ride-hailing, "desc": ride-hailing service, which can provide a chauffeur-driven car-on-demand, taxicab, or other similar service. The "markup" field may describe the interface of this ride-hailing service and the interface response rules. The "API" field may describe the interface information for providing ride-hailing service data.

By using the interface description language (markup), it is possible to define and write interface data for a second interface. The following are example tags that can be included in the markup language: interface descriptive information <layout> and interactive action descriptive information <script>. The interface descriptive information <layout> is used in describing the appearance of the second interface. The interactive action descriptive information <script> is used in defining interactive actions, e.g., tapping or hand gestures, which can be executed at the second interface. The user interface of the second interface and action response to selections of interactive actions may be rendered based on <layout> in a smart terminal, and in some embodiments, interactive actions in response to operations performed on the user interface may also be determined based on <script>. For example, after the button labeled "call" is tapped at the second interface, the ride-hailing service can be accessed. For example, interactive action descriptive information <script> responses may be written using JavaScript for calling the corresponding server (e.g., a third party platform) to execute service operations.

At 404, a first interface is presented by a client and a service request is generated and sent by the client to the server.

The client (a first application) displays a first interface. If the user needs to access another service feature that is not provided by the first application, the user may, through one of various possible input modes (e.g., making a speech command, tapping a button), trigger the generation of a service request of the desired service feature. The service request is then sent to a server.

In an example, if the client/first application needs to embed a second interface that is associated with a third party service/second application, it will send a service request to a server.

Table 2, below, shows the example parameters of a service request:

TABLE 2

| Request Parameter | Explanation of Parameter |
| --- | --- |
| id | Service ID, for identifying the service (second application) for which a second interface needs to be embedded |

TABLE 2-continued

| Request Parameter | Explanation of Parameter |
| --- | --- |
| apiParams | Service request parameters, json format, describing the parameter that the API needs to input; used in customizing a service request |

For example, if the second application provided a ride-hailing service, the service request may carry the "id" (service identifier) of 123 and "apiParams" (service request parameters) fields. For example, the service request parameter is a route parameter, which describes a route that starts from Xihu (West Lake) and ends at Xixi National Wetland Park.

While not shown in the example of Table 2, an additional request parameter that may be included in the service request is a "designated position" field that describes the position/location that the requested second interface is to be embedded within the first interface.

At 406, a service identifier is determined by the server based on the service request. The server parses the service request and extracts the "id" field.

At 408, interface data corresponding to the service identifier is looked up.

At 410, the interface data is sent from the server to the client.

The server uses the service identifier to look up and determine the interface data for the second interface provided by the corresponding third party service provider. As shown in Table 1 above, the extracted "id" field can be matched against the "id" field of the stored interface data. The server sends the matching interface data to the client.

At 412, the interface data is parsed and used to generate a second interface.

At 414, the second interface is embedded and displayed within a designated position in the first interface.

In some embodiments, the client (first application) may obtain a parsing engine (which is also sometimes referred to as a "markup engine"), in advance, from the server. The parsing engine is used to parse interface data written using interface description language (markup). In various embodiments, the markup engine is an engine that parses markup and calls the operating system GUI framework to generate a user interface, specifically, the second interface. Therefore, after interface data is received, the markup engine may be used to render the markup language as the second interface. Then this second interface is embedded into the context of the first interface at a designated position to present the second interface in the first interface.

In some embodiments, the parsing engine that is obtained by the client includes: a first parsing engine for parsing interface descriptive information, a second parsing engine for mapping UI (user interface) controls, and a third parsing engine for parsing interactive action descriptive information.

The first parsing engine may also be called a "markup parser." It is used to parse markup text (i.e., interface descriptive information written in markup language). It can parse XML-based markup text into structured data, which is made available for subsequent generation of UIs and interactive script.

Figure 5:
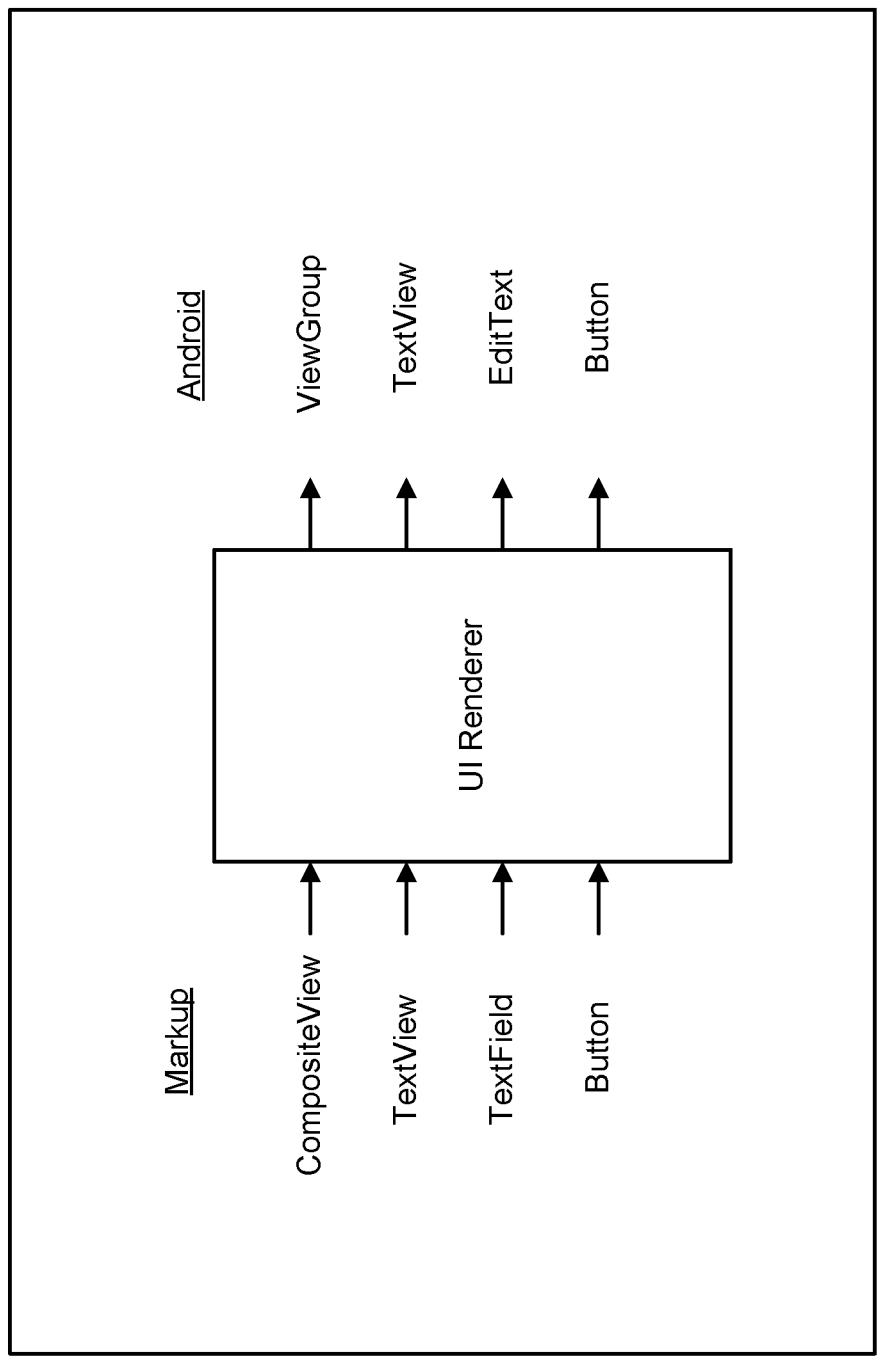
FIG. 5 is a diagram that shows an example second parsing engine.

The second parsing engine may also be called a "UI renderer." It is used to convert UI elements contained in markup <layout> into UI controls in operating systems corresponding to various smart terminals and to generate corresponding UIs (second interfaces) for the terminals. In some embodiments, a corresponding UI renderer is created for each different operating system (e.g., that is used by various mobile platforms). The UI renderer may map each UI element in markup to a UI control on a mobile platform. Thus, it is possible to use UI renderers to generate the needed UIs (second interfaces) on the basis of markup-described UIs for various supported operating systems. Taking an Android® operating system as an example, FIG. 5 is a diagram that shows an example second parsing engine. As shown in FIG. 5, the markup UI elements Composite-View, TextView, TextField, and Button are mapped by the UI renderer to the UI controls ViewGroup, TextView, EditText, and Button in an Android® operating system.

Returning to FIG. 4, the third parsing engine may also be called a "script engine." It is provided to the runtime environment that executes the script data contained in <script>. This runtime environment is composed of V8 and nodes. Using this industry-standard JavaScript runtime environment, the script defined in markup may be executed when rendering a second interface to business logic requirements in the second interface. In one example, the third parsing engine uses JavaScript to implement parsing of and responses to interactive action descriptive information.

As described above, the interface data is composed using a markup language to describe UIs and execution logic. By parsing the received interface with a markup engine, a first application may obtain an embeddable, second interface with interactive capabilities. This second interface is integrated with an existing context (first interface) of the first application. In this way, a third party service can be seamlessly embedded within the first application and the user is provided with a wider array of service features without ever having to leave a currently open (first) interface of the first application.

At 416, an operation request is sent from the client to the third party platform.

At 418, an operation response is determined and sent from the third party platform to the client.

Using the script engine, the second interface is able to provide service features provided by the third party service provider. For example, the second interface may present interactive elements with which the user may interact to request services associated with the third party service provider. For example, a user may select an interactive element that is presented at the second interface. In response, the script engine is configured to use the script data in the interface data to provide a response based on the selected element. For example, the response may be determined by querying the third party service provider (third party platform) and then presenting the response received from the third party service provider at the second interface. For example, if the second application associated with the second interface is a ride-hailing service, routing or other information may be uploaded to the ride-hailing server, and it is through the ride-hailing server that the ride-hailing tasks are distributed and the result of which (e.g., an indication that a driver has been found) is sent to the client and presented at the second interface. Thus, a user of the terminal may interact with the dynamic content of the second interface that is embedded within a first interface of a first application, without needing to close the first application or switch back and forth between the first interface and the second interface.

Figure 6:
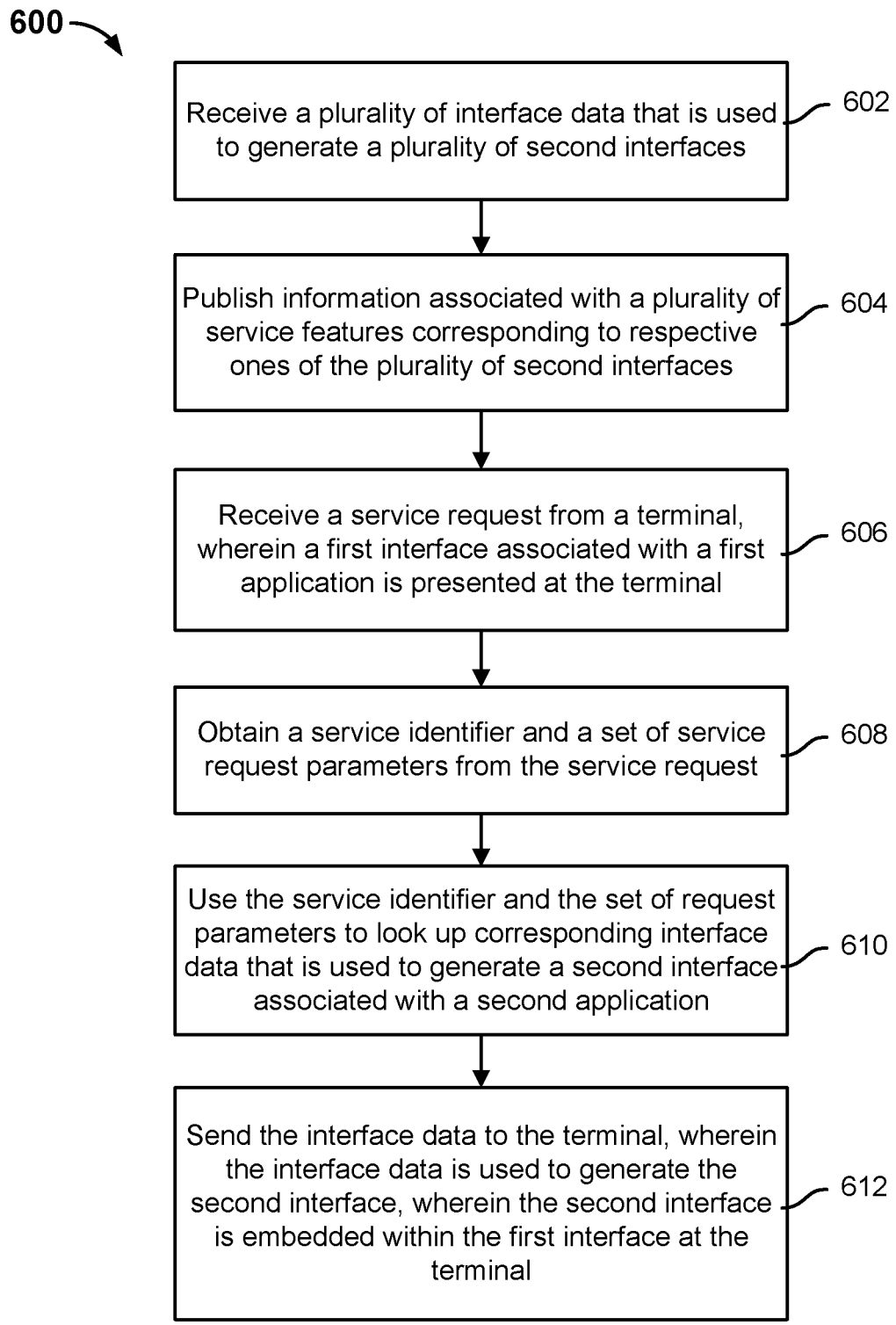
FIG. 6 is a flow diagram showing an example of a process for managing and sending interface data at a server.

FIG. 6 is a flow diagram showing an example of a process for managing and sending interface data at a server. In some embodiments, process 600 may be implemented at server 102 of FIG. 1A. In some embodiments, process 300 of FIG. 3 may be implemented at least in part using process 600.

At 602, a plurality of interface data that is used to generate a plurality of second interfaces is received.

At 604, information associated with a plurality of service features corresponding to respective ones of the plurality of second interfaces is published.

As mentioned above, in various embodiments, a server may publish writing rules, definitions of service features, and so on for the markup language that is to be used by third party platforms to generate the interface data. Therefore, a third party service provider may obtain the markup language from the server, and use the markup language definitions to generate interface data for a corresponding second interface associated with a second application that is provided by the third party service provider. Then the third party service provider uploads the generated interface data to the server. The interface data is then made available to other applications by virtue of its publication at a service platform associated with the server and also the server's distribution of such interface data in response to service requests.

A developer of a first application that supports the embedding of third party service features via second applications may determine through a server the third party services that are available. Then, corresponding controls and/or other input modes for issuing service requests for such embedded second applications may be configured in the first application such that a user that is using a first interface of the first application may call (via an input mode that triggers a generation of a service request) for a second interface of a desired, second application to be embedded within the first interface at the user's terminal.

At 606, a service request is received from a terminal, wherein a first interface associated with a first application is presented at the terminal.

For example, the service request is sent from the terminal in response to a user selection of a service feature that is not provided by the first interface associated with a first application via an input mode.

At 608, a service identifier and a set of service request parameters are obtained from the service request.

The service request includes a service identifier that is used to identify a request service feature. The set of service request parameters is configured to be passed to and, if appropriate, processed by the second application that is associated with providing the requested service feature.

At 610, the service identifier and the set of service request parameters are used to look up corresponding interface data that is used to generate a second interface associated with a second application.

The service identifier obtained from the service request is compared against service identifiers associated with stored instances of interface data to determine a matching interface data. As mentioned above, the interface data may be written in markup language that is capable of describing a user interface (the second interface). As mentioned above, the second interface may include interactive elements with which a user can select to send and/or receive data from a related third party service provider via the second interface.

The set of service request parameters obtained from the service request is passed to the interface data and can be used to update the interface data before the interface data is sent to the terminal. For example, if a positioning service feature is needed for a second application associated with a ride-hailing request or a request to make restaurant reservations, the service request parameters may include positioning information. That is, after the interface data is determined according to the service identifier, the set of service request parameters may be used to update corresponding parameters in the interface data. A second interface that is generated from the interface data that is updated with service request parameters reflects the service request parameters and/or includes results that are determined based on processing the parameters. In a first example, a second interface associated with a ride-sharing application may directly display the starting location and the destination location that had been included in the service request as service request parameters. In a second example, a second interface associated with a restaurant reservation making application may directly display take-out restaurants in the vicinity of the location that had been included in the service request as a service request parameter.

At 612, the interface data is sent to the terminal, wherein the interface data is used to generate the second interface, wherein the second interface is embedded within the first interface at the terminal.

After acquiring interface data of the embeddable second interface, the interface data for the second interface may be provided as feedback to the client so that embeddable interface service features may be provided on the client to facilitate user operations.

The interface data is sent to the terminal from which the service request was received. The terminal is then configured to parse the interface data and then use the parsed interface data to generate a second interface associated with a second application. The second interface is configured to be embedded and presented within the first interface associated with the first application such that the user of the terminal is provided a seamless integration of interfaces associated with two applications (e.g., associated with different service providers) simultaneously at the display screen of the terminal. The user can interact with both the first interface and the second interface that concurrently appear at the display to access the services that are respectively provided by each of the first interface and the second interface.

Figure 7:
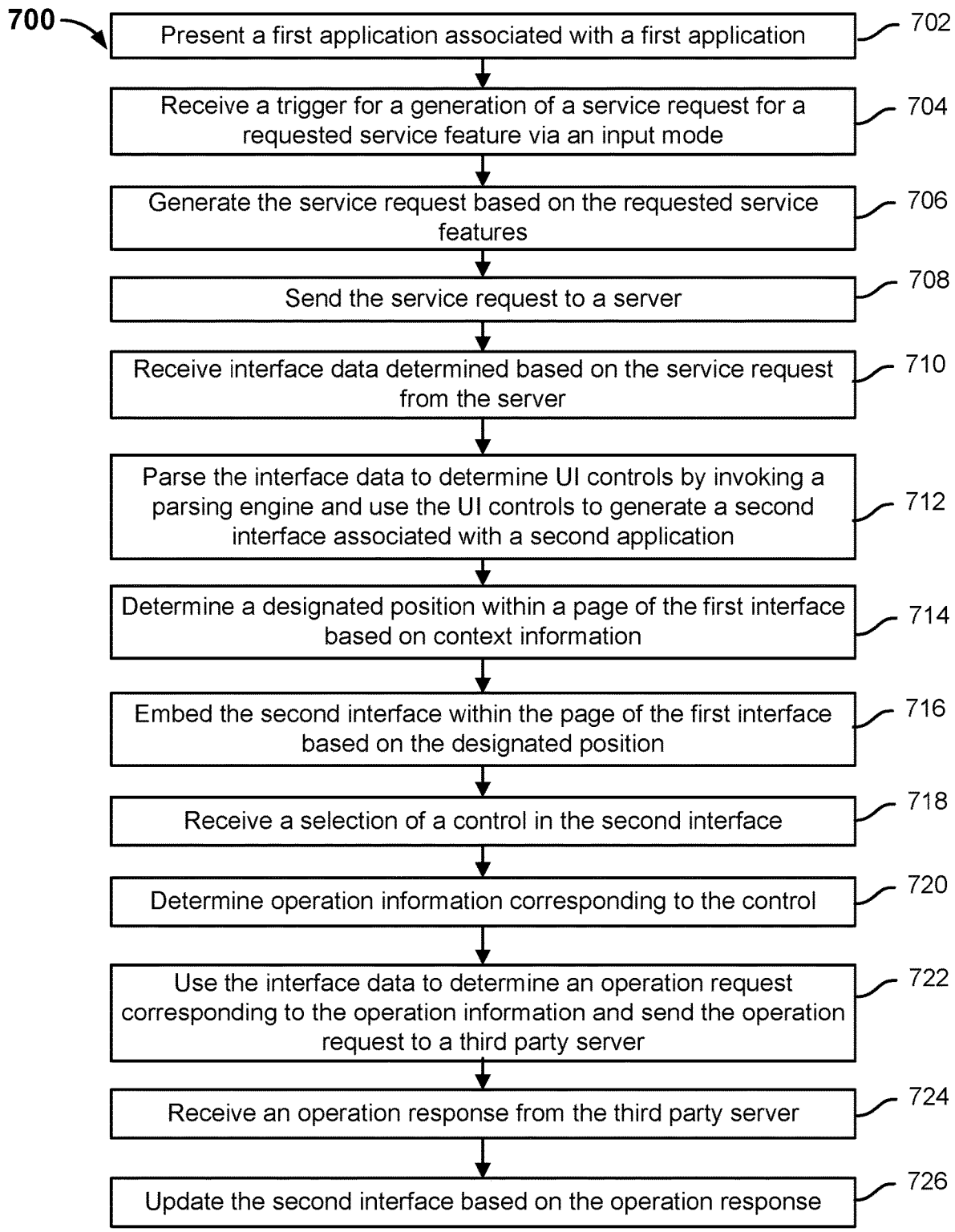
FIG. 7 is a flow diagram showing an embodiment of a process for embedding an interface of one application into an interface of another application.

FIG. 7 is a flow diagram showing an embodiment of a process for embedding an interface of one application into an interface of another application. In some embodiments, process 700 may be implemented, at least in part, at a terminal such as terminal 160 of FIG. 1B.

At 702, a first interface associated with a first application is presented.

A first interface of a first application that is currently running at a terminal is displayed at the display screen of the terminal. Examples of the first application may include a shopping application, a ticket purchasing application, a ride-hailing application, and a reading application. In some embodiments, the first application is configured to support the embedding of a second interface of another, second application.

At 704, a trigger for a generation of a service request for a requested service feature is received via an input mode.

At 706, the service request is generated based on the requested service features.

While the user is using the first interface, the user may want to request a service feature that is not provided by the first application. The user can request such a service feature by triggering the generation of a service request for the requested service feature via various one of multiple predetermined input modes. Generation of the service request may be triggered via one of the following example input modes:

1) The service request is generated by a user triggering a control that is presented at the first interface. Controls such as buttons may be provided in the first interface. These buttons and other controls may identify the third party service(s) that the current, first application is capable of supporting in the form of an embeddable second interface associated with a second application. Thus, by tapping a button, the user can trigger a control to generate a service request. The service request includes the service identifier of the requested third party service associated with the selected control and other information such as the service request parameters.

For example, returning to FIG. 2, it is assumed that the button control B3 of the first interface is a control that, once selected, generates a service request for a third party service. By selecting button B3, a user may generate a service request and send the service request to a server associated with the first application. If multiple types of third party services are provided, a list of third party services may be displayed in the first interface to the user after the user selects button B3. Then, after the user selects the requested third party service, a corresponding service request that includes at least the service identifier associated with the selected third party service is generated and sent to the server.

2) A service request is generated through speech recognition of recorded speech data. The user may also trigger generation of a service request through a speech recognition mode. That is, the user may use the terminal to record speech data while the first interface is being displayed. Moreover, speech-to-text technology at the terminal can be used to recognize the speech data and determine the identifier or name of the requested third party service and other such information. In some embodiments, after the requested third party service is determined, a prompt that identifies the requested third party service is presented at the first interface so that the user can confirm whether or not it is the third party service that he or she had requested, to prevent the occurrence of an operating error.

3) The service request is generated by the user performing a preset gesture on the first interface. In some embodiments, preset gestures, such as shaking, one or more finger swipes, or mid-air gestures, for example, may be configured to activate third party services in the first application. Upon determining that a gesture input conforms to a preset gesture, the first application may determine the service identifier of the third party service and the service request parameters corresponding to the activated third party service for generating a service request. The service request may be directly generated after the preset gesture is detected. Or the service request may be generated after multiple third party services are displayed for the user and the user chooses one particular third party service from among the displayed choices.

As mentioned above, the service request parameters provide the requested third party service-related arguments for the current context of the first interface associated with the first application. Thus, ultimately, the service request parameters are to be used to update the interface data so that the interface data can reflect the current context of the first interface. For example, if geolocation information is used in a ride-hailing service or a food delivery ordering service, geolocation information may be used as a service request parameter. Therefore, in some embodiments, geolocation information is determined at the terminal using a positioning sensor and this geolocation information is included in the service request as a service request parameter. If, when a service request is generated through a preset mode, it is determined that geolocation information is required by the requested service feature/third party service, then it is possible to invoke a geolocation sensor, such as a Global Positioning System (GPS) sensor, to acquire the smart terminal's current geolocation information. In a ride-hailing or navigating service, the destination location may be determined from the first interface or according to user input and also added to the geolocation information service request parameters.

After the terminal generates the service request, in some embodiments, it can use the service identifier to look locally on the terminal for a service feature identified by this service identifier. If it is present, the terminal may directly call locally stored interface data, if available, and parse and generate the embeddable second interface. If the interface data is not present locally, the terminal will send a service request to the server to request that the interface data be returned. In some embodiments, the terminal subsequently stores the received interface data in a local service database. The next time there is a service request with the same service identifier, the terminal may directly acquire the locally stored interface data.

At 708, the service request is sent to a server.

At 710, interface data determined based on the service request is received from the server.

The server may use the service request as a basis to determine interface data for the second interface corresponding to the requested third party service. The determined interface data is then sent back to the terminal. The terminal parses the received interface data and generates the second interface. Moreover, the terminal may determine the designated position for embedding the second interface within the first interface and then embed the second interface at the designated position in a page of the first interface. In some embodiments, the designated position is determined by the terminal based on context information associated with the first application and/or the first interface.

At 712, the interface data is parsed to determine UI controls by invoking a parsing engine and the UI controls are used to generate a second interface associated with a second application.

A parsing engine may be set up in advance in the terminal or the first application. The parsing engine is configured to parse the interface data to generate the content to be presented in the second interface and the operation information relating to (e.g., user selections of controls presented within) the second interface. For example, the operation information includes "UI controls" that determine which types of controls (e.g., interactive elements) are to be presented in the second interface. The parsed interface data may then be used to generate the non-interactive elements (e.g., images and text) of the second interface as well as the interactive elements (e.g., selectable controls/buttons) of the second interface.

A first parsing engine may be invoked to parse interface descriptive information. The interface descriptive information is parsed into structured data, e.g., <layout> text written using markup language is parsed into structured data. Then the second parsing engine calls the structured data to determine the UI elements required by the interface. The UI elements are mapped to UI controls required by the second interface.

Because different smart terminals may use different operating systems, applications that are installed on the smart terminals are set up according to the terminals' corresponding operating systems. When a first application requests interface data that is used to generate a second interface, the requested interface data may be acquired on the basis of the operating system on which the terminal is running. For example, the service request may include an identifier associated with the operating system that is executing at the terminal. In some embodiments, a corresponding parsing engine is configured to parse interface data for each type of terminal operating system. For example, a corresponding parsing engine may be configured for interface data associated with Apple iOS® and a corresponding parsing engine may be configured for interface data associated with Android®. As such, an operating system specific parsing engine is received at a terminal and is able to convert UI elements found within interface data into UI controls associated with its corresponding operating system.

At 714, a designated position within a page of the first interface is determined based on context information.

At 716, the second interface is embedded within the page of the first interface based on the designated position.

In some embodiments, the second interface is embedded within the first interface of the first application at a designated position that is determined based on the context associated with the first interface and/or first application. For example, the first application can determine the designated position as, for example, the position between the currently selected first interface item and the next item in the first interface. After the designated position is determined, the second interface may be embedded into and presented at the designated position in the first interface. For example, embedding the second interface within the first interface at the designated position involves inserting the second interface at the designated position of the first interface and shifting the content of the first interface that follows the designated position to be displayed below the presentation of the second interface. Thus the second interface is inserted into the designated position of the first interface while the original content of the first interface continues to remain unobscured by the second interface.

At 718, a selection of a control in the second interface is received.

At 720, operation information corresponding to the control is determined.

At 722, the interface data is used to determine an operation request corresponding to the operation information and the operation request is sent to a third party server.

At 724, an operation response is received from the third party server.

At 726, the second interface is updated based on the operation response.

After the second interface is presented within the first interface, third party services may be provided to the user through the second interface. The second interface may execute interactive actions in response to user selected operations at the second interface. For example, in response to a user selection of an operation (e.g., a control or other type of interactive element) at the second interface, a response to the selected operation is determined based on the interface data and the response information may be presented within the second interface. If the retrieval and/or the presentation of the response to the selected operation is dictated by the interface data to require communication with a third party server, then the third party server may be queried by the terminal using an operation request.

For example, a control such as a button may be presented in the second interface. Thus, a user may trigger the control by tapping it. The trigger serves as a basis to determine corresponding operation information corresponding to the button. For example, operation information corresponding to the button may include whether and what type of information is to be obtained/processed in response to the selection of the button and also, where the information is to be obtained from and/or where the processing is to be performed. Then interactive actions corresponding to the operation information are executed using interactive action descriptive information that is included in the interface data. For example, interactive action descriptive information that is included in the interface data may dictate that in response to the triggered button, specified types of information are to be sent from the terminal to a third party server in an operation request and that a specified page is to be presented in the second interface as a response to the trigged button.

For example, where the second interface is associated with a ride-hailing application, an operation request for a needed ride-hailing service is generated by the user tapping a button at the second interface. The user may further input the start-point and end-point addresses as request parameters to the operation request for the ride-hailing service. The resulting operation request is sent to a third party server associated with providing the ride-hailing service.

After the third party server receives the operation request, it may execute operation logic corresponding to the operation request and determine the corresponding operation response information. For example, in the case of a ride-hailing request, the third party server associated with supporting the ride-hailing service may issue the ride-hailing task that is maintained by the third party server as the task status and order information subsequent to the order being received as operation response information. In another example, in the case of a food delivery request, the order processing status, delivery status, and so on are maintained by the third party server as operation response information. The third party server can then send the operation response information to the terminal. The received operation response information can be used to update the second interface. For example, updating the second interface with the operation response information includes presenting at least a portion of the operation response information within the second interface.

In a first example application of the techniques described herein, a first application may be a movie ticket purchasing application that is activated on a smart terminal. The interface of the movie ticket purchasing application is referred to in this example as a first interface. The user may then may select a movie theater therefrom and purchase a movie ticket within the movie ticket purchasing application. After the tickets are purchased, the user may wish to directly hail a taxi to the movie theater from his or her current location and thus may trigger a service request for requesting a taxi. The service request may include the ride-hailing service ID and user address-to-movie theater address service request parameters. If the smart terminal has not locally stored interface data for the ride-hailing service ID, it may send the service request to the server associated with the movie ticket purchasing application. The server may then obtain the interface data for the ride-hailing service ID and send that interface data back to the smart terminal. The smart terminal may use a markup engine to parse the interface data and may generate a second interface associated with the ride-hailing application. The smart terminal may also embed and present the second interface at a designated position of a movie ticket purchasing application interface. The content of the movie ticket purchasing application interface following the designated position correspondingly shifts. Thus, the ride-hailing interface is displayed in a manner that is embedded in the movie ticket purchasing application interface without affecting the display of other content in the movie ticket purchasing application interface. While ordering a movie ticket, the user may directly reserve a ride to the movie theater to watch a movie without ever leaving the movie ticket purchasing application interface, which enables the user to experience a seamless transition between two different applications at the same display screen of the smart terminal.

In a second example application of the techniques described herein, a first application may be a chat application that is activated on a smart terminal. The interface of the chat application is referred to in this example as a first interface. While the user of the terminal engages in a chat with another at the first interface, the user makes a user selection at the first interface to issue a service request with a restaurant reservation service ID. The server associated with providing the chat interface may then obtain interface data that includes a restaurant reservation interface that is determined based on the terminal's current location. Alternatively, if the service request included a group purchasing service ID, then the obtained interface data may include the group purchasing interface corresponding to a product that needs to be group-purchased, etc. The interface data is then sent back to the smart terminal. The chat application may parse and render a second interface associated with the requested service/second application from the interface data. The rendered second interface may then be embedded and presented at the designated position of the chat interface so that the user can make restaurant reservations and/or product purchases while chatting.

In a third example application of the techniques described herein, a first application may be an application downloading application that is activated on a smart terminal. The interface of the application downloading application is referred to in this example as a first interface. For example, the user of the terminal may select an interactive element corresponding to each application that is available to be downloaded to cause the terminal to issue a corresponding service request for interface data that is used to generate a second interface associated with the selected application.

The second interface may then be generated and embedded within the interface of the application downloading application to provide a preview of the application of interest.

In a fourth example application of the techniques described within, a first application may be a news application or an electronic magazine application. The interface of the news application or an electronic magazine application is referred to in this example as a first interface. For example, the user of the terminal may select an interactive element corresponding to a particular news/magazine feature to cause the terminal to issue a corresponding service request for interface data that is used to generate a second interface associated with the selected feature. The second interface may then be generated and embedded within the interface of the news application or an electronic magazine application to enrich the original content of the news application or an electronic magazine application by seamlessly blending interfaces.

Please note that all the method embodiments have been presented as a series of a combination of actions in order to simplify the description. However, persons skilled in the art should know that embodiments of the present application are not limited by the action sequences that are described, for some of the steps may make use of another sequence or be implemented simultaneously in accordance with embodiments of the present application.

Figure 8:
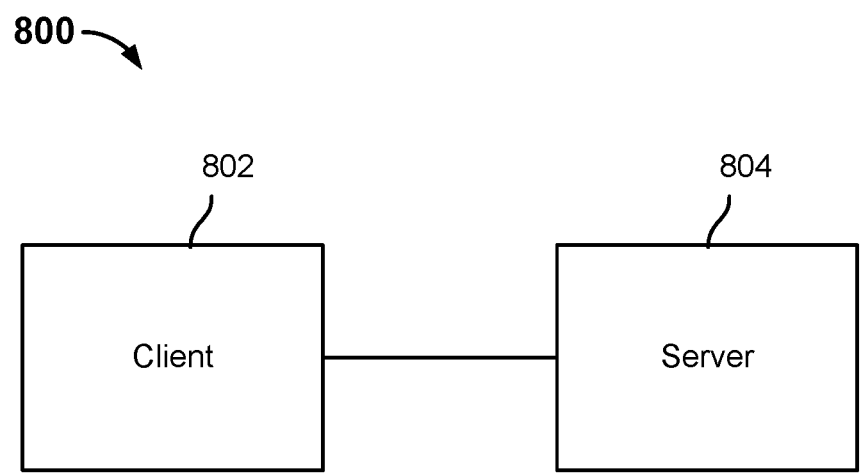
FIG. 8 is a diagram showing an embodiment of a system for embedding an interface of one application into an interface of another application.

FIG. 8 is a diagram showing an embodiment of a system for embedding an interface of one application into an interface of another application. System 800 includes client 802 and server 804.

Client 802 comprises an application that is executing at a terminal. Client 802 is configured to present a first interface and send a triggered service request to a server. Furthermore, client 802 is configured receive interface data corresponding to the service request from the server. Client 802 is configured to parse the received interface to generate a second interface and then embed and present the second interface within a page of the first interface.

Server 804 is configured to determine interface data for the second interface based on the service request and send the interface data for the second interface to client 802.

In some embodiments, the second interface is displayed at a designated position on a page of the first interface. The original content at the designated position on the page is accordingly shifted to another position on the page so that the second interface will not obscure the original content of the first interface.

Client 802 is further configured to receive operation information relating to the second interface and respond to the operation information based on the interface data.

Server 804 is further configured to obtain interface data for second interfaces corresponding to various third party servers and publish corresponding third party services.

Figure 9:
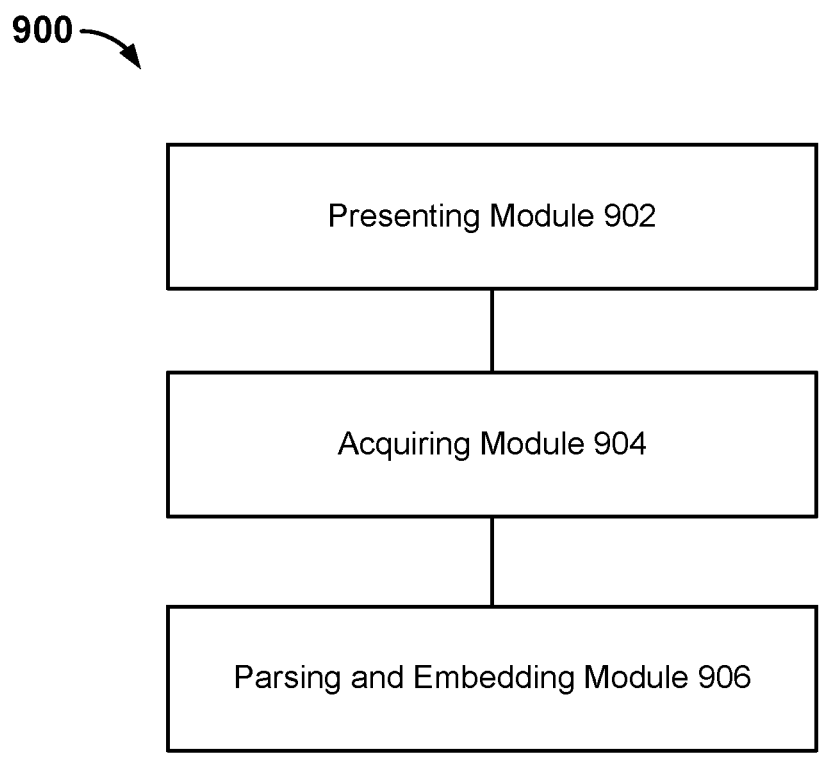
FIG. 9 is a diagram showing an embodiment of a terminal for embedding an interface of one application into an interface of another application.

FIG. 9 is a diagram showing an embodiment of a terminal for embedding an interface of one application into an interface of another application. Terminal 900 includes presenting module 902, acquiring module 904, and parsing and embedding module 906.

The modules, sub-modules, and units described above can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules, sub-modules, and units may be implemented on a single device or distributed across multiple devices.

Presenting module 902 is configured to present a first interface.

Acquiring module 904 is configured to acquire interface data for a second interface based on a triggered service request.

Parsing and embedding module 906 is configured to embed and present the second interface in a page of the first interface after parsing the interface data.

In some embodiments, parsing and embedding module 906 comprises: a parsing submodule that is configured to parse the interface data and generate a second interface and an embedding submodule that is configured to embed and present the second interface in a designated position in a page of the first interface.

If the interface data comprises interface descriptive information, the parsing submodule is configured to invoke a parsing engine to parse the interface descriptive information. The UI controls obtained from parsing are used to generate the second interface.

The parsing submodule is configured to invoke the parsing engine to parse the interface descriptive information into structured data. UI elements are determined according to the structured data. The UI elements are parsed into the UI controls needed by the second interface.

The embedding submodule is configured to use context information associated with the first application and/or first interface as a basis to determine the designated position within a page of the first interface and to embed the second interface into the designated position and present the second interface at the designated position.

In some embodiments, terminal 900 further comprises: a responding module that is configured to receive operation information relating to the second interface and respond to the operation information based on the interface data.

In some embodiments, the interface data comprises interactive action descriptive information. The second interface comprises controls that are for executing the interactive actions corresponding to the interactive action descriptive information upon being triggered.

The responding module is configured to receive a trigger of a control in the second interface and determine the corresponding operation information. The interactive action descriptive information is used to execute the interactive actions corresponding to the operation information.

The responding module is configured to use the interactive action descriptive information to determine the operation request corresponding to the operation information and to send the operation request to a third party server corresponding to the second interface. The operation response information is received as feedback from the server, and the corresponding content is presented in the second interface according to the operation response information.

In some embodiments, terminal 900 further comprises an engine setup module that is configured to set up a parsing engine in advance. The parsing engine is configured to parse the interface data to generate a second interface and to respond to operation information relating to the second interface. In some embodiments, the parsing engine comprises: a first parsing engine that is configured to parse interface descriptive information, a second parsing engine that is configured to map UI controls, and a third parsing engine that is configured to parse interactive action descriptive information.

In some embodiments, terminal 900 further comprises a request triggering module that is configured to trigger the generation of service requests via one of the following possible input modes: generating a service request by triggering a control of the first interface; generating a service request by subjecting recording speech data to speech recognition; generating a service request by a preset gesture on the first interface.

In some embodiments, terminal 900 further comprises: a parameter determining module that is configured to obtain positioning information using a positioning sensor and determine the positioning information as a service request parameter to add to the service request.

The interface data is generated on the basis of a markup language. The markup language is for describing the interface and interface interactions.

Figure 10:
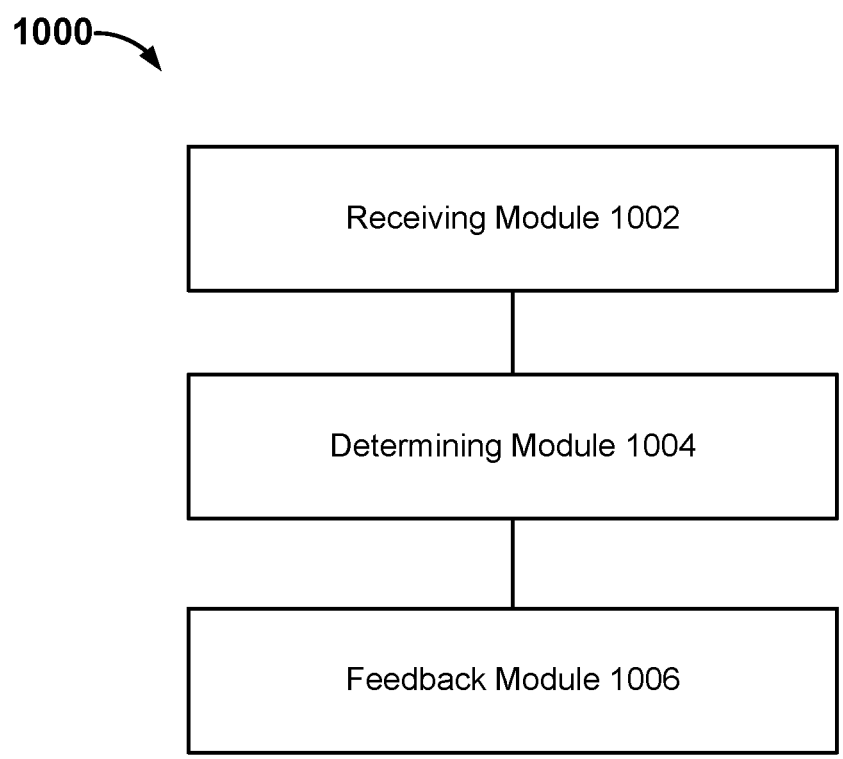
FIG. 10 is a diagram showing an embodiment of a server for embedding an interface of one application into an interface of another application.

FIG. 10 is a diagram showing an embodiment of a server for embedding an interface of one application into an interface of another application. Server 1000 includes receiving module 1002, determining module 1004, and feedback module 1006.

Receiving module 1002 is configured to receive a service request from a client. The service request is triggered while the first interface is presented at the client.

Determining module 1004 is configured to determine interface data for a second interface based on the service request.

Feedback module 1006 is configured to send the interface data for the second interface as feedback to the client so that it can embed and present the second interface in a page of the first interface.

Determining module 1004 is configured to obtain a service identifier from the service request and use the service identifier to look up interface data for the second interface that had been provided by a corresponding third party server.

Determining module 1004 is further configured to obtain service request parameters from the service request and use the service request parameters to update the interface data.

In some embodiments, server 1000 further comprises a publishing module that is configured to obtain interface data for second interfaces corresponding to various third party servers and publish corresponding third party services.

In various embodiments, the interface data comprises interface descriptive information and interactive action descriptive information. The interface data can be generated on the basis of a markup language, for example. The markup language is configured to describe interfaces and interface interactions.

An embodiment of the present application further provides a non-volatile readable storage medium. One or more modules (programs) are stored in the storage medium. When the one or more modules are applied to a terminal device, the terminal device can be enabled to execute instructions of all the method steps in the embodiment of the present application.

Figure 11:
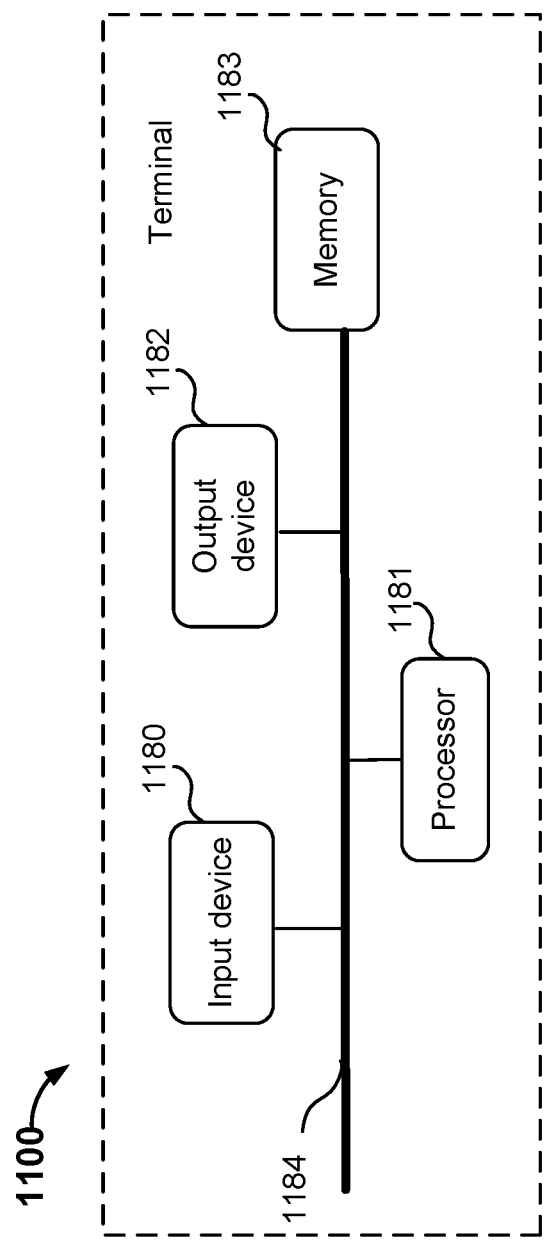
FIG. 11 is a hardware structural diagram of a terminal that is configured to embed an interface of one application into an interface of another application.

FIG. 11 is a hardware structural diagram of a terminal that is configured to embed an interface of one application into an interface of another application. Terminal 1100 may include input device 1180, processor 1181, output device 1182, memory 1183, and at least one communication bus 1184. Communication bus 1184 is configured to implement inter-component communication connections. Memory 1183 may contain high-speed RAM memory. It may also contain non-volatile memory (NVM), such as at least one magnetic disk storage device. Memory 1183 may store various programs used to complete various processing functions and to implement the method steps of the present embodiment.

Optionally, processor 1181 could be implemented as a central processing unit (CPU), an application-specific integrated circuit (ASIC), a digital signal processor (DSP), a digital signal processing device (DSPD), a programmable logic device (PLD), a field-programmable gate array (FPGA), a controller, a microcontroller, a microprocessor, or another electronic component. Processor 1181 is coupled to the aforementioned input device 1180 and output device 1182 through a wired or wireless connection.

Optionally, input device 1180 may comprise multiple input devices. For example, it could comprise at least one of the following: a user-oriented user interface, a device-oriented device interface, a software programmable interface, a camera, and a sensor. Optionally, the device-oriented device interface may be a wired interface for conducting device-to-device data transmissions, or it could be a hardware insertion interface (e.g., a USB interface or a serial port) for conducting device-to-device data transmissions. Optionally, the user-oriented user interface could, for example, be user-oriented control keys, a speech input device for receiving speech input, or a touchscreen perceiving device (such as a touchscreen or a touch tablet having touch-sensing functions). Optionally, the programmable interface of the software described above could be a portal, such as a chip input pin interface or output interface, through which the user edits or modifies the program. Optionally, the transceiver described above could be a radio-frequency transceiver chip, a baseband chip, or a transceiver antenna. A microphone or other audio input device can receive speech data. Output device 1182 may include a display device, sound equipment, and other output devices.

In the present embodiment, the processor of the computing device comprises functions for executing all modules in the data-processing means in each device. For specific functions and technical results, refer to the embodiments described above. They will not be discussed further here.

Figure 12:
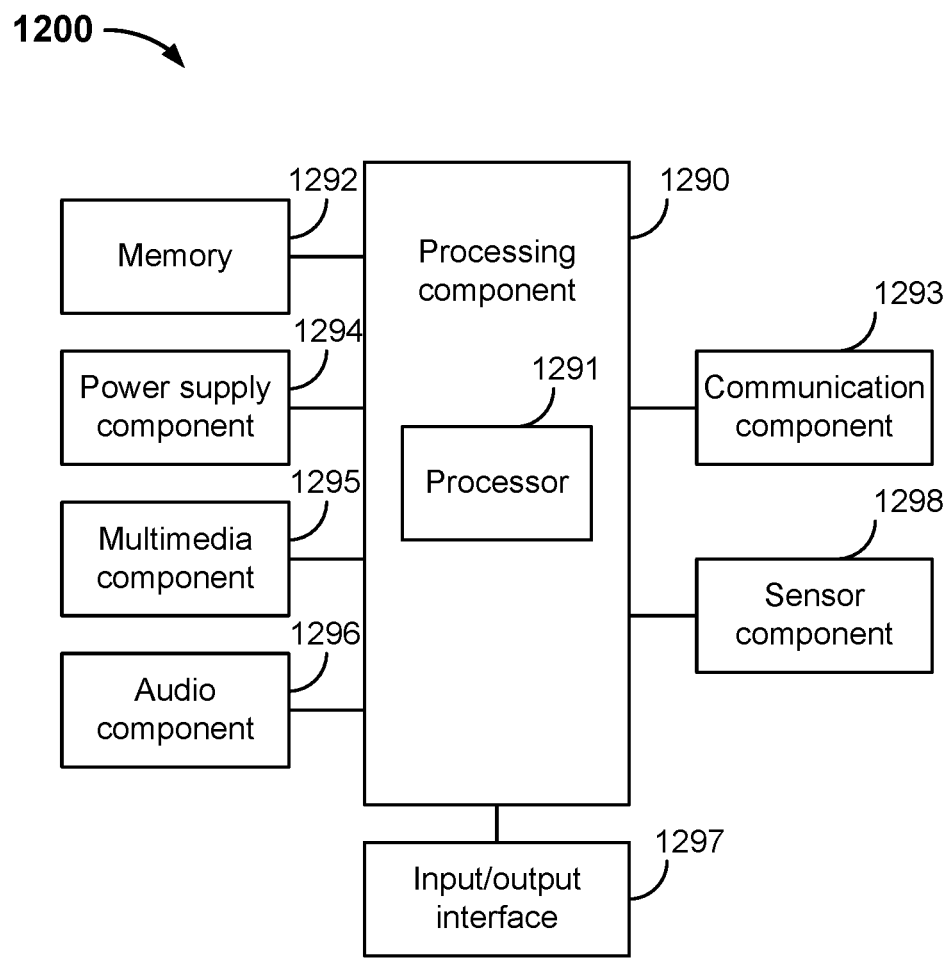
FIG. 12 is a hardware structural diagram of a terminal that is configured to embed an interface of one application into an interface of another application.

FIG. 12 is a hardware structural diagram of a terminal that is configured to embed an interface of one application into an interface of another application. FIG. 12 is a specific embodiment in the implementation process relating to FIG. 11. As shown in FIG. 12, terminal 1200 comprises a processor 1291 and memory 1292.

Processor 1291 executes the computer code stored in the memory 1292 and thus implements the data-processing methods of FIGS. 1 through 7 and in the embodiments described above.

Storage device 1292 may be configured to store various types of data to support operations on the smart terminal. Examples of this data include any app or method instructions, such as messages, pictures, and video, used for operations on the smart terminal. Memory 1292 may contain random access memory (RAM) and may also contain non-volatile memory, such as at least one magnetic disk storage device.

Optionally, processor 1291 is set up in processing component 1290. Terminal 1200 may further comprise: communication component 1293, power supply component 1294, multimedia component 1295, audio component 1296, input/output interface 1297, and/or sensor component 1298. The components specifically contained within the terminal are set according to need. The present embodiment imposes no limitations with regard to them.

Processing component 1290 generally controls the overall operations of the smart terminal. Processing component 1290 can comprise one or more processors 1291 for executing instructions so as to complete all or some of the steps of the method described above with regard to FIGS. 1 through 7. In addition, processing component 1290 may comprise one or more modules to facilitate interaction between processing component 1290 and other components. For example, processing component 1290 may comprise a multimedia module to facilitate interaction between multimedia component 1295 and processing component 1290.

Power supply component 1294 provides electric power to the various components of the smart terminal. Power supply 1294 can include a power supply management system, one or more power supplies, and other components related to generating, managing, and allocating power to the smart terminal.

Multimedia component 1295 comprises an output interface display screen provided between the smart terminal and the user. In some embodiments, the display screen may comprise a liquid crystal display (LCD) or a touch panel (TP). If the display screen comprises a touch panel, the display screen may be implemented as a touchscreen to receive input signals from the user. The touch panel comprises one or more touch sensors to detect touches, sliding actions, and gestures on the touch panel. The touch sensor can not only detect the boundaries of touch or slide actions, but also can measure duration and pressure related to the touch or slide operations.

Audio component 1296 is configured to output and/or input audio signals. For example, audio component 1296 includes a microphone (MIC). When the terminal is in an operating mode, e.g., speech recognition mode, the microphone is configured to receive external audio signals. The received audio signals can be further stored in storage device 1292 or sent by communication component 1293. In some embodiments, audio component 1296 further comprises a speaker for output of audio signals.

Input/output interface 1297 provides an interface between processing component 1290 and peripheral interface modules. The aforesaid peripheral interface modules may be keyboards, click wheels, buttons, etc. These buttons may include but are not limited to: volume button, start button, and lock button.

Sensor component 1298 comprises one or more sensors and is used to provide status evaluations of various aspects of the smart terminal. For example, sensor component 1298 may detect the on/off status of the smart terminal, the relative position of the component, and the presence or absence of contact between the user and the smart terminal. Sensor component 1298 may comprise a near sensor that is configured to detect the presence of a nearby object when there is no physical contact, including the measurement of distance between the user and the smart terminal. In some embodiments, the sensor component 1298 may further comprise a camera.

Communication component 1293 is configured to facilitate wired or wireless communication between the smart terminal and other devices. The terminal may access wireless networks based on a communications standard such as WiFi, 2G, 3G, or combinations thereof. In an embodiment, the terminal may comprise a SIM card slot. The SIM card slot is for inserting a SIM card, which enables the smart terminal to register with a GPRS network and establish communication between the Internet and servers.

It is clear from the above that communication component 1293, audio component 1296, input/output interface 1297, and sensor component 1298 that relate to the FIG. 12 embodiment may serve as an implementation of the input device in the FIG. 11 embodiment.

In a terminal of the present embodiment, the display device is coupled to the processor and presents a first interface, and the second interface is embedded and displayed within a page of the first interface. Furthermore, the processor acquires interface data for the second interface based on the triggered service request and the display is triggered to embed and present the second interface in a page of the first interface after the interface data is parsed. The communication component, coupled to the processor, may issue the service request.

In another server, the communication component, coupled to the processor, receives a service request. The service request is triggered while a first interface is presented at the terminal. The processor determines interface data of a second interface based on the service request. The interface data for the second interface is provided as feedback to the client so as to embed and present the second interface within a page of the first interface.

An embodiment of the present application further provides a context-based service operating system.

Figure 13:
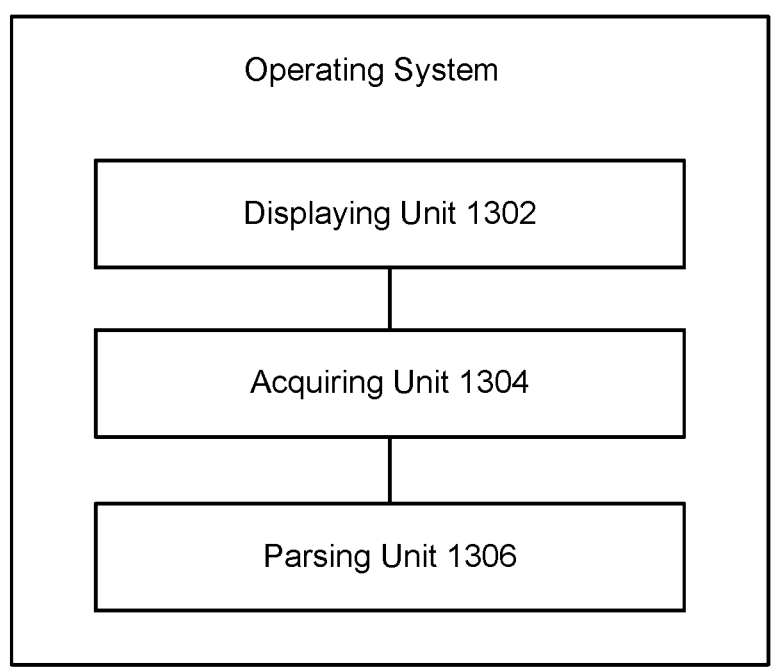
FIG. 13 is a diagram showing an embodiment of a terminal device operating system.

FIG. 13 is a diagram showing an embodiment of a terminal device operating system. Operating system 1300 comprises displaying unit 1302, acquiring unit 1304, and parsing unit 1306.

Displaying unit 1302 is configured to present a first interface.

Acquiring unit 1304 is configured to acquire interface data for a second interface based on a triggered service request.

Parsing unit 1306 is configured to embed and present the second interface in a page of the first interface after parsing the interface data.

Each of the embodiments contained in this description is described in a progressive manner. The explanation of each embodiment focuses on areas of difference from the other embodiments, and the descriptions thereof may be mutually referenced for portions of each embodiment that are identical or similar.

A person skilled in the art should understand that an embodiment of the present application may provide methods, devices, or computer program products. Therefore, the embodiments of the present application may take the form of embodiments that are entirely hardware, embodiments that are entirely software, and embodiments that combine hardware and software aspects. Moreover, an embodiment of the present application may take the form of one or more computer program products implemented on computer-usable storage media (including but not limited to magnetic disk memory, CD-ROM, and optical memory) containing computer-usable program code.

In one typical configuration, the computer equipment comprises one or more processors (CPUs), input/output interfaces, network interfaces, and memory. Memory may include such forms as volatile memory in computer-readable media, random access memory (RAM) and/or non-volatile memory, such as read-only memory (ROM) or flash memory (flash RAM). Memory is an example of a computer-readable medium. Computer-readable media, including permanent and non-permanent and removable and non-removable media, may achieve information storage by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media does not include transitory computer-readable media (transitory media) such as modulated data signals and carrier waves.

The embodiments of the present application are described with reference to flowcharts and/or block diagrams based on methods, terminal devices (systems), and computer program products of the embodiments of the present application. Please note that each process flow and/or block within the flowcharts and/or block diagrams and combinations of process flows and/or blocks within the flowcharts and/or block diagrams can be implemented by computer instructions. These computer program commands can be provided to the processors of general-purpose computers, specialized computers, embedded processor devices, or other programmable data-processing terminals to produce a machine. The commands executed by the processors of the computers or other programmable data-processing terminal devices consequently give rise to means for implementing the functions specified in one or more processes in the flowcharts and/or one or more blocks in the block diagrams.

These computer program commands can also be stored in computer-readable memory that can guide the computers or other programmable data-processing terminal equipment to operate in a specific manner. As a result, the commands stored in the computer-readable memory give rise to products including command devices. These command devices implement the functions specified in one or more processes in the flowcharts and/or one or more blocks in the block diagrams.

These computer program commands can also be loaded onto computers or other programmable data-processing terminal devices and made to execute a series of steps on the computers or other programmable data-processing terminal devices so as to give rise to computer-implemented processing. The commands executed on the computers or other programmable data-processing terminal devices thereby provide the steps of the functions specified in one or more processes in the flowcharts and/or one or more blocks in the block diagrams.

Although preferred embodiments of the present application have already been described, persons skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Lastly, it must also be explained that, in this document, relational terms such as "first" or "second" are used only to differentiate between one entity or operation and another entity or operation, without necessitating or implying that there is any such actual relationship or sequence between these entities or operations. Moreover, the term "comprise" or "contain" or any of their variants are to be taken in their non-exclusive sense. Thus, processes, methods, things, or terminal devices that comprise a series of elements not only comprise those elements, but also comprise other elements that have not been explicitly listed or elements that are intrinsic to such processes, methods, things, or terminal devices. In the absence of further limitations, elements that are limited by the phrase "comprises a(n) . . . " do not exclude the existence of additional identical elements in processes, methods, things, or terminal devices that comprise the elements.

Detailed introductions were provided above to a multiple service-integrating method, a multiple service-integrating system, a multiple service-integrating means, a smart terminal, a server, and a context-based service operating system provided by the present application. This document has applied specific examples to explain the principles and implementations of the present application. The above descriptions of the embodiments are only for the purpose of aiding the understanding of the methods and core concepts of the present application. A person with ordinary skill in the art will always be able to make modifications in keeping with the idea of the present application to specific embodiments and scopes of the application. The content of this specification should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A server, comprising:
a processor configured to:
receive a service request from a terminal, wherein a first interface associated with a first application is presented at the terminal;
determine, included in the service request, an identifier associated with an operating system that is associated with the terminal;
send, to the terminal, a parsing engine corresponding to the operating system;
determine that the service request is associated with a second application;
determine interface data that is used to generate a second interface associated with the second application; and
send the interface data to the terminal, wherein the interface data is used by the parsing engine received at the terminal to:
generate and embed the second interface associated with the second application within the first interface associated with the first application; and
execute interactive action descriptive information included in the interface data to provide an interactive element within the second interface, wherein a user selection of the interactive element is configured to cause an operation request to be sent from the terminal to a third-party platform, wherein an operation response from the third-party platform is received at the terminal and presented within the second interface; and
a memory coupled to the processor and configured to provide the processor with instructions.

2. The server of claim 1, wherein the service request includes a service identifier and a set of service request parameters.

3. The server of claim 2, wherein the processor is configured to:
use the service identifier to look up the interface data; and
update the interface data using the set of service request parameters prior to sending the interface data to the terminal.

4. The server of claim 1, wherein the processor is further configured to:
receive a plurality of instances of interface data that is used to generate a plurality of second interfaces; and
publish information associated with a plurality of service features corresponding to respective ones of the plurality of second interfaces.

5. The server of claim 1, wherein the first application is different from the second application.

6. The server of claim 1, wherein the interface data further comprises interface descriptive information, wherein the interface descriptive information describes an appearance of the second interface.

7. The server of claim 1, wherein the second interface is embedded at a designated position within a page of the first interface associated with the first application, wherein the designated position is determined based at least in part on context information associated with the first interface or the first application.

8. A method, comprising:
receiving a service request from a terminal, wherein a first interface associated with a first application is presented at the terminal;
determining, included in the service request, an identifier associated with an operating system that is associated with the terminal;
sending, to the terminal, a parsing engine corresponding to the operating system;
determining that the service request is associated with a second application;
determining interface data that is used to generate a second interface associated with the second application; and
sending the interface data to the terminal, wherein the interface data is configured to be used by the parsing engine received at the terminal to:
generate and embed the second interface associated with the second application within the first interface associated with the first application; and
execute interactive action descriptive information included in the interface data to provide an interactive element within the second interface, wherein a user selection of the interactive element is configured to cause an operation request to be sent from the terminal to a third-party platform, wherein an operation response from the third-party platform is received at the terminal and presented within the second interface.

9. The method of claim 8, wherein the service request includes a service identifier and a set of service request parameters.

10. The method of claim 9, further comprising:
using the service identifier to look up the interface data; and
updating the interface data using the set of service request parameters prior to sending the interface data to the terminal.

11. The method of claim 8, further comprising:
receiving a plurality of interface data used to generate a plurality of second interfaces; and
publishing information associated with a plurality of service features corresponding to respective ones of the plurality of second interfaces.

12. The method of claim 8, wherein the first application is different from the second application.

13. The method of claim 8, wherein the interface data further comprises interface descriptive information, wherein the interface descriptive information describes an appearance of the second interface.

14. The method of claim 8, wherein the second interface is embedded at a designated position within a page of the first interface associated with the first application, wherein the designated position is determined based at least in part on context information associated with the first interface or the first application.

15. A terminal, comprising:
a processor configured to:
present a first interface associated with a first application;
generate a service request for a requested service feature, wherein the service request includes an identifier associated with an operating system that is associated with the terminal;
send the service request to a server;
receive, from the server, a parsing engine corresponding to the operating system;
receive, from the server, interface data determined based at least in part on the service request;
generate a second interface associated with a second application using the interface data, including to parse the interface data using the parsing engine;
embed and present the second interface associated with the second application within the first interface associated with the first application; and
execute interactive action descriptive information included in the interface data to provide an interactive element within the second interface, wherein a user selection of the interactive element is configured to cause an operation request to be sent from the terminal to a third-party platform, wherein an operation response from the third-party platform is received at the terminal and presented within the second interface; and
a memory coupled to the processor and configured to provide the processor with instructions.

16. The terminal of claim 15, wherein the processor is further configured to receive a user trigger for the generation of the service request via an input mode.

17. The terminal of claim 15, wherein to embed and present the second interface associated with the second application within the first interface associated with the first application comprises to determine a designated position within a page of the first interface associated with the first application based at least in part on context information associated with the first interface or the first application, wherein the second interface associated with the second application is embedded within the first interface associated with the first application at the designated position.

18. A method, comprising:
presenting a first interface associated with a first application;
generating a service request for a requested service feature, wherein the service request includes an identifier associated with an operating system that is associated with a terminal;
sending the service request to a server;

receiving, from the server, a parsing engine corresponding to the operating system;

receiving, from the server, interface data determined based at least in part on the service request;

generating a second interface associated with a second application using the interface data, including parsing the interface data using the parsing engine;

embedding and presenting the second interface associated with the second application within the first interface associated with the first application; and executing interactive action descriptive information included in the interface data to provide an interactive element within the second interface, wherein a user selection of the interactive element is configured to cause an operation request to be sent from the terminal to a third-party platform, wherein an operation response from the third-party platform is received at the terminal and presented within the second interface.

19. The method of claim 18, wherein embedding and presenting the second interface associated with the second application within the first interface associated with the first application comprises determining a designated position within a page of the first interface associated with the first application based at least in part on context information associated with the first interface or the first application, wherein the second interface associated with the second application is embedded within the first interface associated with the first application at the designated position.

20. The method of claim 18, further comprising receiving a user trigger for the generation of the service request via an input mode.

\* \* \* \* \*